United States Patent
Iwazaki

(10) Patent No.: US 7,751,966 B2
(45) Date of Patent: Jul. 6, 2010

(54) ABNORMALITY DIAGNOSTIC DEVICE AND ABNORMALITY DIAGNOSTIC METHOD FOR AIR-FUEL RATIO SENSOR

(75) Inventor: Yasushi Iwazaki, Ebina (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 179 days.

(21) Appl. No.: 12/003,021

(22) Filed: Dec. 19, 2007

(65) Prior Publication Data
US 2008/0154528 A1    Jun. 26, 2008

(30) Foreign Application Priority Data
Dec. 21, 2006  (JP)  ............................ 2006-344848
Nov. 29, 2007  (JP)  ............................ 2007-309478

(51) Int. Cl.
G06F 19/00    (2006.01)
G06G 7/70    (2006.01)

(52) U.S. Cl. .................. 701/114; 701/107; 701/109; 123/690; 123/198 D

(58) Field of Classification Search ................. 123/688, 123/690; 701/107, 109, 114; 702/116, 183, 702/185; 73/114.72, 114.73
See application file for complete search history.

(56) References Cited

U.S. PATENT DOCUMENTS

| 6,287,453 B1 * | 9/2001 | Rosel et al. ................. 205/783 |
| 2006/0089731 A1 * | 4/2006 | Kawakatsu et al. ........... 700/46 |
| 2006/0207560 A1 * | 9/2006 | Kobayashi .................. 123/431 |

FOREIGN PATENT DOCUMENTS

| JP | A 8-232727 | 9/1996 |
| JP | A 2004-68602 | 3/2004 |
| JP | A 2004-360591 | 12/2004 |
| JP | A 2005-30358 | 2/2005 |
| JP | 2006063853 A * | 3/2006 |
| WO | WO 00/04282 A1 | 1/2000 |

* cited by examiner

Primary Examiner—Stephen K Cronin
Assistant Examiner—Anthony L Bacon
(74) Attorney, Agent, or Firm—Oliff & Berridge, PLC

(57) ABSTRACT

In an abnormality diagnostic device and an abnormality diagnostic device for an air-fuel ratio sensor that detects the air-fuel ratio of exhaust gas of an internal combustion engine, a system extending from a fuel injection valve to the air-fuel ratio sensor is model by a first order response delay, and a parameter in the first order response delay is identified based on an input air-fuel ratio that is given to the air-fuel ratio sensor and an output air-fuel ratio that is output from the air-fuel ratio sensor. Then, the presence/absence of abnormality regarding a predetermined characteristic of the air-fuel ratio sensor is determined based on the parameter identified. Thus, abnormality is diagnosed regarding individual characteristics of the air-fuel ratio sensor.

18 Claims, 17 Drawing Sheets

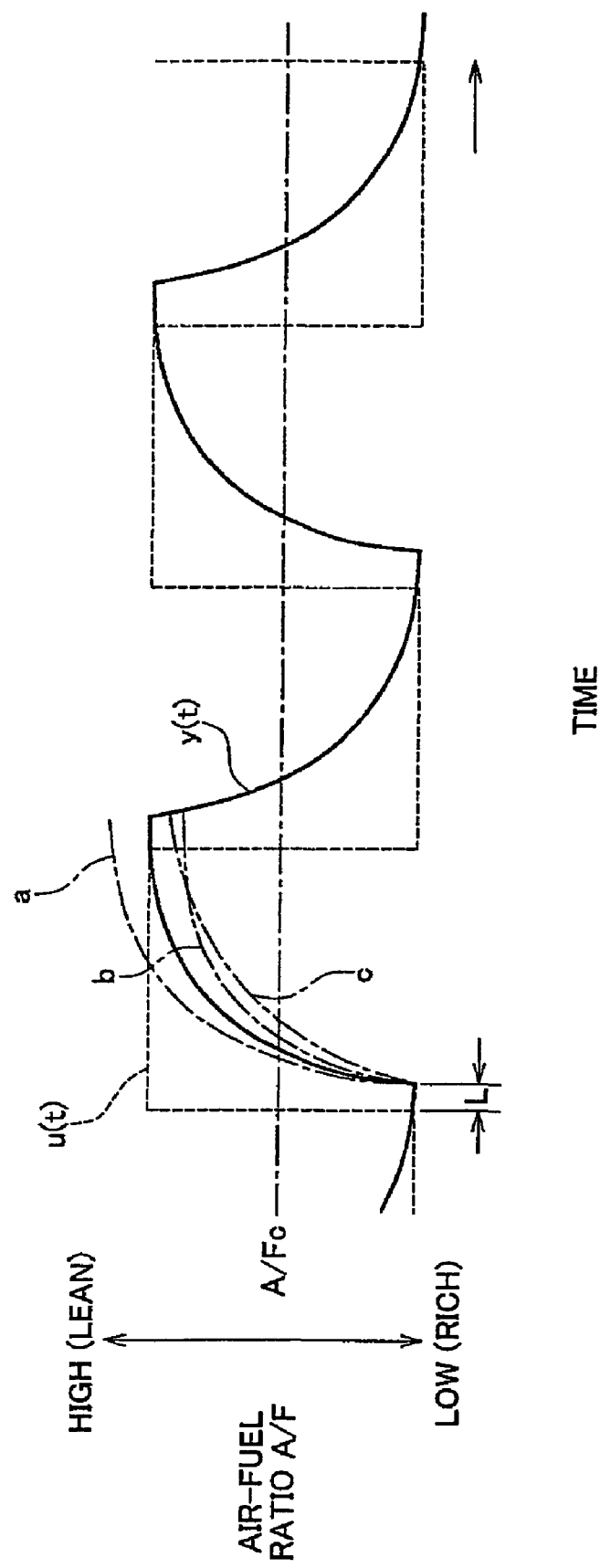

ABNORMALITY DIAGNOSTIC DEVICE AND ABNORMALITY DIAGNOSTIC METHOD FOR AIR-FUEL RATIO SENSOR

INCORPORATION BY REFERENCE

The disclosure of Japanese Patent Applications No. 2006-344848 filed on Dec. 21, 2006 and No. 2007-309478 filed Nov. 29, 2007, including the specification, drawings and abstract are incorporated herein by reference in its entirety.

BACKGROUND OF THE INVENTION

1. Field of the Invention

The invention relates to a device and a method that diagnose the presence/absence of an abnormality of an air-fuel ratio sensor that detects the air-fuel ratio of exhaust gas of an internal combustion engine.

2. Description of the Related Art

In an internal combustion engine equipped with an exhaust gas purification system that uses a catalyst, it is indispensable to control the mixing proportion between air and fuel in a mixture burned in the internal combustion engine, that is, the air-fuel ratio, in order to effectively remove harmful components of exhaust gas through the use of the catalyst. In order to perform the control of the air-fuel ratio, an air-fuel ratio sensor that detects the air-fuel ratio on the basis of the concentration of a specific component of exhaust gas is provided on an exhaust passageway of the internal combustion engine, and feedback control is performed so as to bring the detected air-fuel ratio closer to a predetermined target air-fuel ratio.

If the air-fuel ratio sensor has an abnormality such as degradation, a failure, etc., it becomes impossible to perform accurate air-fuel ratio feedback control, and therefore exhaust gas emissions deteriorate. Therefore, diagnosis of abnormality regarding the air-fuel ratio sensor has been conventionally conducted. In particular, in the case of an engine mounted in a motor vehicle, laws and regulations of various countries require that abnormality regarding the air-fuel ratio sensor mounted in the vehicle (on board) be detected in order to prevent the vehicle from running while emitting deteriorated exhaust gas.

Japanese Patent Application Publication No. 2005-30358 (JP-A-2005-30358) discloses an abnormality detection device for an air-fuel ratio sensor that periodically increases and decreases the air-fuel ratio through an open-loop control and that detects an abnormality of the air-fuel ratio sensor on the basis of the length and area of the locus of the output of the air-fuel ratio sensor that increases and decreases corresponding to the periodical increase and decrease in the air-fuel ratio. Besides, Japanese Patent Application Publication No. 2004-68602 (JP-A-2004-68602) discloses an air-fuel ratio control device that serially identifies (e.g., determines, or estimates) a plant model that represents a detection delay characteristic of the air-fuel ratio sensor, and sets a control gain in an air-fuel ratio feedback control through the use of parameters of the identified plant model. In this related art, the recursive identification is stopped when the diagnosis regarding the response degradation of the air-fuel ratio sensor is performed during the feedback control.

However, although the technology described in Japanese Patent Application Publication No. 2005-30358 (JP-A-2005-30358) is able to discriminate whether the air-fuel ratio sensor itself is normal or abnormal, the technology is not able to discriminate which of the characteristics of the air-fuel ratio sensor is normal or abnormal. Specifically, although the air-fuel ratio sensor has a plurality of characteristics, the technology described in Japanese Patent Application Publication No. 2005-30358 (JP-A-2005-30358) cannot discriminate which of the characteristics is abnormal.

Besides, the technology described in Japanese Patent Application Publication No. 2004-8602 (JP-A-2004-68602) carries out a diagnosis only about degradation of the response rate among the various characteristics of the air-fuel ratio sensor. However, although the air-fuel ratio sensor has other characteristics, abnormality regarding any of these other characteristics cannot be discriminated. In the first place, the technology described in Japanese Patent Application Publication No. 2004-68602 (JP-A-2004-68602) relates to the air-fuel ratio control, and is not specialized for the abnormality diagnosis on the air-fuel ratio sensor. Hence, the parameters of the serially identified plant models are used to set a control gain in the air-fuel ratio feedback control, and the serial estimation is stopped at the time of diagnosis about the response delay of the air-fuel ratio sensor.

SUMMARY OF THE INVENTION

The invention has been accomplished in view of the aforementioned circumstances. In accordance with the invention, there are provided an abnormality diagnostic device and an abnormality diagnostic method for an air-fuel ratio sensor capable that are capable of suitably diagnosing an abnormality regarding individual characteristics of the air-fuel ratio sensor.

Accordingly, there is provided an abnormality diagnostic device for an air-fuel ratio sensor that detects air-fuel ratio of exhaust gas of an internal combustion engine. The abnormality diagnostic device is characterized by including: an identification device that models a system extending from a fuel injection valve to the air-fuel ratio sensor by a first order response delay, and that identifies a parameter in the first order response delay based on an input air-fuel ratio that is given to the air-fuel ratio sensor and an output air-fuel ratio that is output from the air-fuel ratio sensor, and an abnormality determination device that determines presence/absence of abnormality regarding a predetermined characteristic of the air-fuel ratio sensor based on the parameter identified by the identification device.

The foregoing air-fuel ratio sensor abnormality diagnostic device does not merely determine the presence/absence of abnormality of the air-fuel ratio sensor, but determines the presence/absence of abnormality of a predetermined characteristic of the air-fuel ratio sensor. Hence, the abnormality diagnostic device is able to determined which one of a plurality of characteristics of the air-fuel ratio sensor is abnormal, and therefore is able to more precisely and minutely execute the abnormality diagnosis of the air-fuel ratio sensor.

In the foregoing abnormality diagnostic device, it is suitable that the abnormality determination device determine the presence/absence of abnormality regarding at least two of the characteristics of the air-fuel ratio sensor based on at least two parameters identified by the identification device.

According to this air-fuel ratio sensor abnormality diagnostic device, since the presence/absence of abnormality is determined regarding at least two of the characteristics of the air-fuel ratio sensor, the presence/absence of abnormality can be determined simultaneously and individually regarding the at least two characteristics. Thus, the abnormality diagnostic device is very suitable for the abnormality diagnosis of the air-fuel ratio sensor.

Furthermore, in the foregoing abnormality diagnostic device, it is also suitable that the at least two parameters be at least a time constant and a gain, and that the at least two of the characteristics of the air-fuel ratio sensor be at least response rate and output.

Of the characteristics of the air-fuel ratio sensor, response rate and output are important characteristics that considerably change or determine the performance of the sensor. Since the air-fuel ratio sensor abnormality diagnostic device is able to diagnose abnormality regarding the at least two important characteristics, the abnormality diagnostic device is very suitable for the abnormality diagnosis of the air-fuel ratio sensor.

Furthermore, in the abnormality diagnostic device, it is also suitable that the device further include a waste time correction device that calculates a waste time that elapses between the input air-fuel ratio and the output air-fuel ratio, and performs a shift correction of at least one of the input air-fuel ratio and the output air-fuel ratio by an amount of the waste time.

Therefore, it becomes possible to eliminate the influence of the transportation delay of exhaust gas and improve the parameter identification accuracy.

Furthermore, in the abnormality diagnostic device, it is also suitable that the waste time correction device calculate the waste time in accordance with a predetermined map or a predetermined function based on at least one parameter regarding an operation state of the internal combustion engine.

Furthermore, in the abnormality diagnostic device, it is also suitable that the waste time correction device calculate a dispersion value of the input air-fuel ratio and a dispersion value of the output air-fuel ratio, and that if a peak of the dispersion value of the output air-fuel ratio is greater than a predetermined value, the waste time correction device calculate the waste time based on a time difference between a peak of the dispersion value of the input air-fuel ratio and the peak of the dispersion value of the output air-fuel ratio.

Furthermore, in the abnormality diagnostic device, it is also suitable that if the peak of the dispersion value of the output air-fuel ratio is less than or equal to the predetermined value, the waste time correction device calculate the waste time based on a time difference between a pole value of the input air-fuel ratio and a pole value of the output air-fuel ratio.

Furthermore, in the abnormality diagnostic device, it is also suitable that the waste time correction device calculate a first waste time in accordance with a predetermined map, based on at least one parameter regarding an operation state of the internal combustion engine, and calculate a second waste time based on a time difference between a peak of a dispersion value of the input air-fuel ratio and a peak of a dispersion value of the output air-fuel ratio or a time difference between a pole value of the input air-fuel ratio and a pole value of the output air-fuel ratio, and that if a deviation amount of the second waste time from the first waste time is greater than a predetermined value, the waste time correction device determine the second waste time as a final waste time, and update data of the map using the second waste time.

Still further, in the abnormality diagnostic device, it is also suitable that the abnormality diagnostic device further include a bias correction device that performs a shift correction of at least one of the input air-fuel ratio and the output air-fuel ratio so as to remove a bias between the input air-fuel ratio and the output air-fuel ratio.

Therefore, the robustness against load fluctuation, learning deviation, etc., can be improved.

Still further, in the abnormality diagnostic device, it is also suitable that the device further include a fuel correction device that corrects the input air-fuel ratio based on a wall surface deposit amount of fuel and an evaporation amount of fuel.

Therefore, it becomes possible to improve the parameter identification accuracy.

Still further, in the abnormality diagnostic device, it is also suitable that the identification device serially identify the parameter by a recursive least square method.

Therefore, the calculation load or the memory capacity involved in the parameter identification are reduced, so that the practicability improves.

According to another aspect of the invention, there is provided an abnormality diagnostic method for an air-fuel ratio sensor that detects air-fuel ratio of exhaust gas of an internal combustion engine, the method being characterized by including the step of modeling a system extending from a fuel injection valve to the air-fuel ratio sensor by a first order response delay, and identifying a parameter in the first order response delay based on an input air-fuel ratio that is given to the air-fuel ratio sensor and an output air-fuel ratio that is output from the air-fuel ratio sensor; and the step of determining presence/absence of abnormality regarding the air-fuel ratio sensor based on the parameter identified.

In the foregoing abnormality diagnostic method, it is also suitable that in the abnormality determination step, the presence/absence of abnormality be determined regarding at least two of characteristics of the air-fuel ratio sensor based on at least two parameters identified.

Furthermore, in the abnormality diagnostic method, it is also suitable that the at least two parameters be at least a time constant and a gain, and that the at least two of the characteristics of the air-fuel ratio sensor be at least response rate and output.

Furthermore, in the abnormality diagnostic method, it is also suitable that the method further include the step of calculating a waste time that elapses between the input air-fuel ratio and the output air-fuel ratio, and performing a shift correction of at least one of the input air-fuel ratio and the output air-fuel ratio by an amount of the waste time.

Furthermore, in the abnormality diagnostic method, it is also suitable that in the waste time correction step, the waste time be calculated in accordance with a predetermined map or a predetermined function based on at least one parameter regarding an operation state of the internal combustion engine.

Furthermore, in the abnormality diagnostic method, it is also suitable that in the waste time correction step, a dispersion value of the input air-fuel ratio and a dispersion value of the output air-fuel ratio be calculated, and that if a peak of the dispersion value of the output air-fuel ratio is greater than a predetermined value, the waste time be calculated based on a time difference between a peak of the dispersion value of the input air-fuel ratio and the peak of the dispersion value of the output air-fuel ratio.

Still further, in the abnormality diagnostic method, it is also suitable that in the waste time correction step, if the peak of the dispersion value of the output air-fuel ratio is less than or equal to the predetermined value, the waste time be calculated based on a time difference between a pole value of the input air-fuel ratio and a pole value of the output air-fuel ratio.

Still further, in the abnormality diagnostic method, it is also suitable that in the waste time correction step, a first waste time be calculated in accordance with a predetermined map, based on at least one parameter regarding an operation state of the internal combustion engine, and a second waste time be calculated based on a time difference between a peak of a dispersion value of the input air-fuel ratio and a peak of a dispersion value of the output air-fuel ratio or a time difference between a pole value of the input air-fuel ratio and a pole value of the output air-fuel ratio, and that if a deviation amount of the second waste time from the first waste time is greater than a predetermined value, the second waste time be determined as a final waste time, and data of the map be updated using the second waste time.

Still further, in the abnormality diagnostic method, it is also suitable that the method further include the step of performing a shift correction of at least one of the input air-fuel ratio and the output air-fuel ratio so as to remove a bias between the input air-fuel ratio and the output air-fuel ratio.

Still further, in the abnormality diagnostic method, it is also suitable that the method further include the step of correcting the input air-fuel ratio based on a wall surface deposit amount of fuel and an evaporation amount of fuel.

Still further, in the abnormality diagnostic method, it is also suitable that in the identification step, the parameter be serially identified by a recursive least square method.

Therefore, the invention achieves an excellent advantage of being able to suitably diagnose the presence/absence of abnormality regarding individual characteristics of an air-fuel ratio sensor.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which:

FIG. 2 is a graph showing states of changes in the input air-fuel ratio and the output air-fuel ratio of a pre-catalyst sensor;

DETAILED DESCRIPTION OF THE EMBODIMENTS

In the following description and the accompanying drawings, the present invention will be described in more detail with reference to exemplary embodiments.

Figure 1:
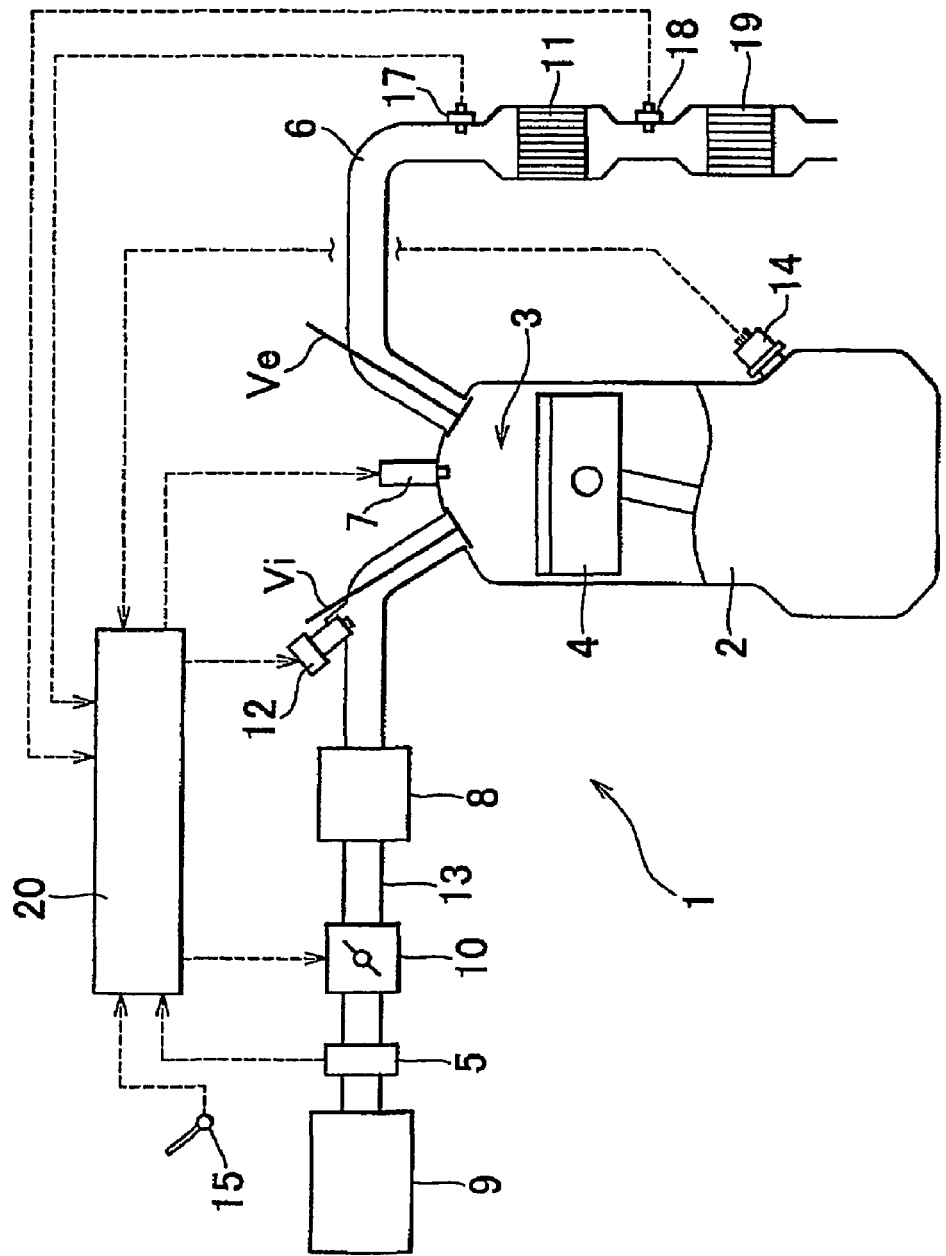
FIG. 1 is a schematic diagram of an internal combustion engine in accordance with an embodiment of the invention.

FIG. 1 is a schematic diagram of an internal combustion engine in accordance with an embodiment of the invention. As shown in FIG. 1, an internal combustion engine 1 generates power by burning a mixture of fuel and air within combustion chambers 3 formed in a cylinder block 2 so that a piston 4 reciprocates within each combustion chamber 3. The internal combustion engine 1 of this embodiment is a vehicular multi-cylinder engine (e.g., a four-cylinder engine, although only one cylinder is shown), and at the same time a spark ignition type internal combustion engine, more specifically, a gasoline engine.

In a cylinder head of the internal combustion engine 1, intake valves Vi that open and close input ports and exhaust valves Ve that open and close exhaust ports are provided separately for the individual cylinders. The intake valves Vi and the exhaust valves Ve are opened and closed by camshafts (not shown). Besides, in a top portion of the cylinder head, ignition plugs 7 for igniting the mixture in the combustion chambers 3 are mounted separately for the individual cylinders.

The intake ports of the cylinders are connected to a surge tank 8 that is an intake collection chamber, via branch pipes of the individual cylinders. An intake pipe 13 forming an intake collection passageway is connected to an upstream side of the surge tank 8, and an air cleaner 9 is provided on an upstream end of the intake pipe 13. The intake pipe 13 is provided with an air flow meter 5 for detecting the amount of intake air, and an electronically controlled throttle valve 10, in that order from the upstream side. The intake ports, the branch pipes, the surge tank 8 and the intake pipe 13 form the intake passageway.

An injector (fuel injection valve) 12 that injects fuel into the intake passage, in particular, an intake port, is provided for each cylinder. The fuel injected from each injector 12 is mixed with intake air to form a mixture that is taken into a corresponding combustion chamber 3 when the intake valve Vi is opened. Then, the mixture is compressed by the piston 4, and is ignited to burn by the ignition plug 7.

On the other hand, the exhaust ports of the cylinders are connected to an exhaust pipe 6 that forms an exhaust collection passageway, via the branch pipes of the individual cylinders. The exhaust ports, the branch pipes and the exhaust pipe 6 form an exhaust passageway. The exhaust pipe 6 is provided with catalysts 11, 19 at an upstream side and a downstream side. Each catalyst 11, 19 is made up of a three-way catalyst. Air-fuel ratio sensors 17, 18 for detecting the air-fuel ratio of exhaust gas are provided at a location preceding the upstream-side catalyst 11 and a location following the upstream-side catalyst 11, that is, a pre-catalyst sensor 17 and a post-catalyst sensor 18 are provided. The pre-catalyst and post-catalyst sensors 17, 18 each detect an air-fuel ratio on the basis of the oxygen concentration in exhaust gas. The pre-catalyst sensor 17 is made up of a so-called wide-range air-fuel ratio sensor, and is capable of continuously detecting the air-fuel ratio over a relatively wide range, and outputs an electrical signal proportional to the air-fuel ratio. On the other hand, the post-catalyst sensor 18 is made up of a so-called $O_2$ sensor, and has a characteristic that the output voltage changes sharply at the stoichiometric air fuel ratio.

The ignition plugs 7, the throttle valve 10, the injectors 12 and the like are electrically connected to an electronic control unit (hereinafter, abbreviated as "ECU") 20 provided as a control device. The ECU 20 includes a CPU, a ROM, a RAM, input/output ports, a storage device, etc. although none of them is shown. Various sensors are electrically connected to the ECU 20 as shown in FIG. 1 via A/D converters or the like (not shown). Besides the aforementioned air flow meter 5 as well as the pre-catalyst sensor 17 and the post-catalyst sensor 18, the sensors connected to the ECU 20 also include a crank angle sensor 14 that detects the crank angle of the internal combustion engine 1, an accelerator operation amount sensor 15 that detects the accelerator operation amount, and other various sensors. On the basis of values detected by such sensors and the like, the ECU 20 controls the ignition plugs 7, the throttle valve 10, the injectors 12, etc. to control the ignition timing, the amount of fuel injection, the fuel injection timing, the degree of throttle opening, etc. so that a desired output is obtained. Incidentally, in ordinary cases, the throttle opening degree is controlled to an opening degree that corresponds to the accelerator operation amount.

Each of the catalysts 11, 19 simultaneously removes NOx, HC and CO when the air-fuel ratio A/P of the inflowing exhaust gas is the stoichiometric air fuel ratio (e.g., A/F=14.6). Corresponding to the simultaneous removal of these substances, the ECU 20 controls the air-fuel ratio so that the air-fuel ratio A/F of the exhaust gas flowing into the catalysts 11, 19 becomes equal to the stoichiometric air fuel ratio (so-called stoichiometric control) during ordinary operation of the internal combustion engine. Concretely, the ECU 20 sets a target air-fuel ratio A/Ft equal to the stoichiometric air fuel ratio, and calculates such a basic fuel injection amount that the air-fuel ratio of the mixture flowing into the combustion chamber 3 becomes equal to the target air-fuel ratio A/Ft. In accordance with a difference between the actual air-fuel ratio A/Ffr detected by the pre-catalyst sensor 17 and the target air-fuel ratio A/Ft, the ECU 20 feedback-controls the basic fuel injection amount. Then, the ECU 20 electrifies (turns on) the injectors 12 for an electrification time that corresponds to the corrected fuel injection amount. As a result, the air-fuel ratio of the exhaust gas supplied to the catalysts 11, 19 is kept within the vicinity of the stoichiometric air fuel ratio, so that maximum purification capability of the catalysts 11, 19 can be achieved. In this manner, the ECU 20 feedback-controls the air-fuel ratio (the fuel injection amount) so that the actual air-fuel ratio A/Ffr detected by the pre-catalyst sensor 17 approaches the target air-fuel ratio A/Ft.

Next, an abnormality diagnosis of the air-fuel ratio sensor in accordance with the embodiment will be described. In this embodiment, an object of the diagnosis is an air-fuel ratio sensor disposed at an upstream side of the upstream-side catalyst 11, that is, the pre-catalyst sensor 17.

In this abnormality diagnosis, the system extending from the injectors 12s to the pre-catalyst sensor 17 is modeled using a first order response delay, and a parameter in the first order response delay is identified (estimated) on the basis of an input air-fuel ratio given to the pre-catalyst sensor 17 and an output air-fuel ratio produced from the pre-catalyst sensor 17. Then, on the basis of the identified parameter, the presence/absence of an abnormality regarding a predetermined characteristic of the pre-catalyst sensor 17 is determined.

As the input air-fuel ratio, a ratio Ga/Q between a fuel injection amount Q calculated on the basis of the duration of electrification of each injector 12 and an intake air amount Ga calculated on the basis of the output of the air flow meter 5. Hereinafter, the input air-fuel ratio will be represented by u(t) (u(t)=Ga/Q). On the other hand, the output air-fuel ratio is the pre-catalyst air-fuel ratio A/Ffr calculated on the basis of the output of the pre-catalyst sensor 17. Hereinafter, the output air-fuel ratio will be represented by y(t) (y(t)=A/Ffr). From the manner in which the output air-fuel ratio y(t) is produced when the pre-catalyst sensor 17 obtained as described above is given, a parameter in the first order response delay is identified. On the basis of the identified parameter, an abnormality regarding the predetermined characteristic of the pre-catalyst sensor 17 is determined.

As shown in FIG. 2, in this embodiment, an active control of compulsorily oscillating the air-fuel ratio is executed on the occasion of the abnormality diagnosis of the air-fuel ratio sensor. In this active control, the target air-fuel ratio A/Ft (i.e., the input air-fuel ratio u(t)) is oscillated at a fixed period so that the air-fuel ratio A/Ffr detected by the pre-catalyst sensor 17 (i.e., the output air-fuel ratio y(t)) oscillates with equal widths of oscillation (equal amplitudes) to the lean side and the rich side from a predetermined center air-fuel ratio A/Fc. The amplitude of the oscillation is set greater than that occurs during the ordinary air-fuel ratio control, for example, at 0.5 in terms of the air-fuel ratio. The center air-fuel ratio A/Fc is made equal to the stoichiometric air fuel ratio.

A reason for executing the active control at the time of the abnormality diagnosis is that since the active control is executed during steady operation of the engine, the various control quantities and various detection values become stable, and the accuracy of the diagnosis improves. However, the abnormality diagnosis may also be executed during an ordinary air-fuel ratio control.

As shown in FIG. 2, the input air-fuel ratio u(t) has a step-like waveform while the output air-fuel ratio y(t) has a waveform with a first order response delay. In FIG. 2, L shows a waste time based on the transportation delay from the input air-fuel ratio u(t) to the output air-fuel ratio y(t). That is, the waste time L corresponds to the time difference between the fuel injection from the injector 12 and the time at which the exhaust gas resulting from the fuel injection reaches the pre-catalyst sensor 17.

If it is assumed that the waste time L is zero for the sake of simplification, the first order response delay is represented as in $G(s)=k/(1+T\times s)$. In this equation, k is the gain of the pre-catalyst sensor 17, and T is a time constant of the pre-catalyst sensor 17. The gain k is a value related to the output of the pre-catalyst sensor 17, among the characteristics thereof. On the other hand, the time constant T is a value related to the response rate of the pre-catalyst sensor 17, among the characteristics thereof. In FIG. 2, a solid line representing the output air-fuel ratio y(t) shows a case where the pre-catalyst sensor 17 is normal. On the other hand, if an abnormality occurs in the output characteristic of the pre-catalyst sensor 17, the gain k becomes greater than that of a normal condition, so that the sensor output increases (enlarges) as shown by a line a, and the sensor output decreases (shrinks). Therefore, by comparing the identified gain k with a predetermined value, the ECU 20 can specifically determine whether the abnormality is an increase abnormality or a decrease abnormality. On the other hand, if an abnormality occurs in the response rate of the pre-catalyst sensor 17, the time constant T, in most cases, becomes greater than that of a normal condition, so that the sensor output is produced with a delay as shown by a line c. Therefore, by comparing the identified time constant T with a predetermined value, the ECU 20 can specifically determine the presence/absence of an abnormality in the response rate of the sensor.

Next, a method for the identification of the gain k and the time constant T executed by the ECU 20 will be described.

A transfer function of a first order response delay system having a time constant T and a gain k is represented as follows:

$$G(s) = \frac{k}{1 + T \times s} \quad (1)$$

If this is subjected to the bilinear transformation of s→z (continuous→discrete transformation) (s is substituted):

$$s = \frac{2(1 - z^{-1})}{\Delta(I + z^{-1})} \quad (2)$$

(Δ: sampling interval)

then the following equations are obtained:

$$G(z) = \frac{\Delta \times k \times Z^{-1} + \Delta \times k}{(\Delta - 2T) \times Z^{-1} + (\Delta + 2T)} = \frac{Z^{-1} + 1}{b_2 Z^{-1} + b_1} \quad (3)$$

$$\therefore b_1 = \frac{\Delta - 2T}{\Delta \times k}, \, b_2 = \frac{\Delta + 2T}{\Delta \times k} \quad (4)$$

If the equations (4) are solved with respect to T and k, the following equations are obtained:

$$T = \frac{b_1 - b_2}{b_1 + b_2} \times \frac{\Delta}{2}, \, k = \frac{2}{b_1 + b_2} \quad (5)$$

Thus, if the unknown parameters $b_1$, $b_2$ are found, the time constant T and the gain k of the sensor can be found from equation (5). If the measured input and output are $\bar{u}(t)$, $\bar{y}(t)$, respectively, and the corresponding z transformations are $\bar{U}(z)$, $\bar{Y}(z)$ respectively, then from the equation (3) the following conversion is obtained:

$$\bar{Y}(z) = G(z) \times \bar{U}(z) \quad (6)$$

$$= \frac{z^{-1} + 1}{b_2 z^{-1} + b_1} \times \bar{U}(z) \rightarrow b_2 \bar{Y}(z) z^{-1} + b_1 \bar{Y}(z)$$

$$= \bar{U}(z) z^{-1} + \bar{U}(z)$$

Besides, the inverse z transformation of the equation (6) gives the following equation:

$$b_2 \bar{y}(t-1) + b_1 \bar{y}(t) = \bar{u}(t-1) + \bar{u}(t) \quad (7)$$

If the foregoing equation is rewritten with respect to the sample time t, t−1, . . . , 1, then $$\begin{bmatrix} \bar{u}(t) + \bar{u}(t-1) \\ \bar{u}(t-1) + \bar{u}(t-2) \\ \cdots \\ \bar{u}(2) + \bar{u}(1) \end{bmatrix} = \begin{bmatrix} \bar{y}(t) & \bar{y}(t-1) \\ \bar{y}(t-1) & \bar{y}(t-2) \\ \cdots & \cdots \\ \bar{y}(2) & \bar{y}(1) \end{bmatrix} \begin{bmatrix} b_1 \\ b_2 \end{bmatrix} \quad (8)$$

If the following redefinitions are made:

$$y(t) = \bar{u}(t) + \bar{u}(t+1)$$

$$\phi(t) = [\bar{y}(t), \bar{y}(t-1)]^T \quad (9)$$

then the equation (8) can be expressed as follows:

$$\begin{bmatrix} y(t) \\ y(t-1) \\ \cdots \\ y(2) \end{bmatrix} = \begin{bmatrix} \varphi^T(t) \\ \varphi^T(t-1) \\ \cdots \\ \varphi^T(2) \end{bmatrix} \begin{bmatrix} b_1 \\ b_2 \end{bmatrix} \Rightarrow y = F \times \theta \quad (10)$$

Thus, the least square identification value of an identification parameter vector that contains unknown parameters $b_1$, $b_2$ can be identified as $\hat{\theta} = (F^T F)^{-1} \times F^T \times y$, and from the equation (5), T and k can be found.

From the foregoing description, $(F^T F)^{-1}$ can be calculated by calculating an inverse matrix $\hat{\theta}(t)$. However, considering the packaging into the ECU, the inverse matrix is not preferable since it increases the amount of calculation. Therefore, recursive solution of the inverse matrix portion is considered.

Firstly, $P(t) = (F^T F)^{-1}$ is assumed.

$$\hat{\theta}(t) = \quad (11)$$

$$P(t)F^T \times y = P(t) \left\{ [\varphi(1), \varphi(2), \ldots, \varphi(t)] \begin{bmatrix} y(1) \\ y(2) \\ \cdots \\ \cdots \\ y(t) \end{bmatrix} \right\} = P(t) \sum_{k=1}^{t} \varphi(k) y(k)$$

From the equation (11), $$\hat{\theta}(t-1) = P(t-1) \sum_{k=1}^{t-1} \varphi(k) y(k)$$

can also be obtained, and therefore the equation (11) can be rewritten as:

$$\hat{\theta}(t) = P(t) \left\{ \sum_{k=1}^{t-1} \varphi(k) y(k) + \varphi(t) y(t) \right\} \quad (12)$$

$$= P(t) \{ P^{-1}(t-1) \times \hat{\theta}(t-1) + \varphi(t) y(t) \}$$

Besides, the transformation of $$P(t) = (F^T F)^{-1} = \tag{13}$$

$$\left\{ [\varphi(1), \varphi(2), \ldots, \varphi(t)] \begin{bmatrix} \varphi^T(1) \\ \varphi^T(2) \\ \ldots \\ \ldots \\ \varphi^T(t) \end{bmatrix} \right\}^{-1} = \left\{ \sum_{k=1}^{t} \varphi(k)\varphi^T(k) \right\}^{-1}$$

gives $$P^{-1}(t) = \tag{14}$$

$$\sum_{k=1}^{t} \varphi(k)\varphi^T(k) = \sum_{k=1}^{t-1} \varphi(k)\varphi^T(k) + \varphi(t)\varphi^T(t) = P^{-1}(t-1) + \varphi(t)\varphi^T(t)$$

If using the equation (14), the portion $P^{-1}$ (t−1) of the equation (12) is erased, then $\hat{\theta}(t)$ can be represented as in the following recurrence formula.

$$\hat{\theta}(t) = P(t)\{(P^{-1}(t) - \varphi(t)\varphi^T(t)) \times \hat{\theta}(t-1) + \varphi(t)y(t)\} \tag{15}$$

$$= \hat{\theta}(t-1) + P(t)\varphi(t)(y(t) - \varphi^T(t) \times \hat{\theta}(t-1))$$

Herein, in the theorem related to the inverse matrix, the following equation is given:

$$(A^{-1} + C^T B^{-1} D)^{-1} = A - AC^T (DAC^T + B)^{-1} DA \tag{16}$$

If substitution is performed as in A→P(t−1), C→ϕ$^T$(t), B→1, and D→ϕ$^T$(t), the equation (14) can be expressed as follows.

$$\{P^{-1}(t-1) + \varphi(t)\varphi^T(t)\}^{-1} = \{P^{-1}(t)\}^{-1} = P(t) = \tag{17}$$

$$P(t-1) - P(t-1)\varphi(t)\{\varphi^T(t)P(t-1)\varphi(t) + 1\}^{-1} \varphi^T(t) \times P(t-1)$$

Furthermore, if the equation (17) is rewritten after multiplying both sides of the equation by ϕ(t), then P(t) can also be represented in the following fashion of recurrence.

$$(\varphi^T(t)P(t-1)\varphi(t) + 1 \text{ is a scalar.}) \tag{18}$$

$$P(t)\varphi(t) = P(t-1)\varphi(t) \times \frac{1}{\varphi^T(t)P(t-1)\varphi(t) + 1} = K(t)$$

Furthermore, a predicted error is defined as follows, $$\epsilon(t) = y(t) - \varphi^T(t) \times \hat{\theta}(t-1) \tag{19}$$

By substituting the equations (18) and (19) into the equation (15), $\hat{\theta}$ is finally represented by a recurrence reference.

$$\hat{\theta}(t) = \hat{\theta}(t-1) + K(t) \times \epsilon(t) \tag{20}$$

Thus, $\hat{\theta} = (F^T F)^{-1} F^T xy$ can be recursively solved.

The equation (20) is a function of the values occurring at the present sample time t and the previous sample time t−1, and means that b1 and b2, that is, T and k, are updated at every sample time on the basis of the present value and the previous value. In this manner, the time constant T and the gain k are serially identified by a recursive least square method. This method, in which the recursive identification is performed, is able to lessen the computation load and reduce the capacity of the buffer for temporarily holding data, as compared with a method in which many pieces of sample data are acquired and stored temporarily, and then the identification is performed. Thus, the above-described method is preferable in the packaging into an ECU (in particular, a motor vehicle-purpose ECU).

The sensor characteristic abnormality determination method executed by the ECU 20 is as follows. Firstly, if the identified time constant T is greater than a predetermined time constant abnormality criterion value Ts, it is determined that a response delay is occurring and the pre-catalyst sensor 17 has a response rate abnormality. On the other hand, if the identified time constant T is less than or equal to the time constant abnormality criterion value Ts, it is determined that the pre-catalyst sensor 17 is normal with regard to response rate.

Furthermore, if the identified gain k is greater than a predetermined gain increase abnormality criterion value ks1, it is determined that the pre-catalyst sensor 17 has an output increase abnormality. If the identified gain k is smaller than a gain reduction abnormality criterion value ks2 (<ks1), it is determined that the pre-catalyst sensor 17 has an output reduction abnormality. If the identified gain k is equal to or greater than the gain reduction abnormality criterion value ks2 and is less than or equal to the gain increase abnormality criterion value ks1, it is determined that the pre-catalyst sensor 17 is normal with regard to the output.

According to the abnormality diagnosis in accordance with the invention, it is determined not merely whether or not the air-fuel ratio sensor is abnormal, but whether or not the air-fuel ratio sensor is abnormal regarding a predetermined characteristic. Then, through the use of the two identification parameters T, k, the determination of the presence/absence of abnormality can be conducted simultaneously and individually with regard to the response rate and the output. Hence, it becomes possible to realize a very suitable diagnosis of an abnormality of the air-fuel ratio sensor.

Figure 3A:
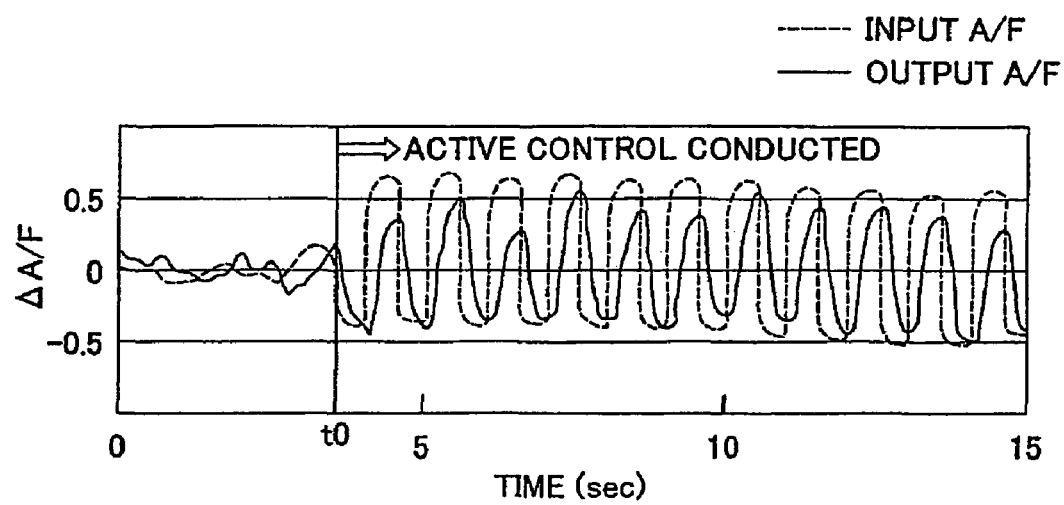
FIGS. 3A and 3B show results of a test showing changes in a time constant and a gain relative to changes in the input air-fuel ratio and the output air-fuel ratio of the pre-catalyst sensor in the case where the sensor is normal.
Figure 3B:
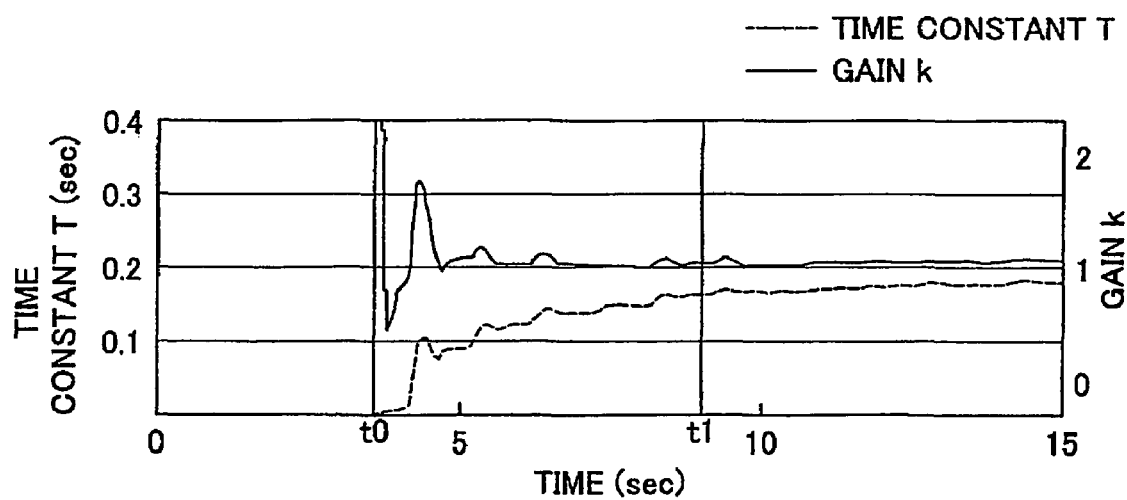
Figure 4A:
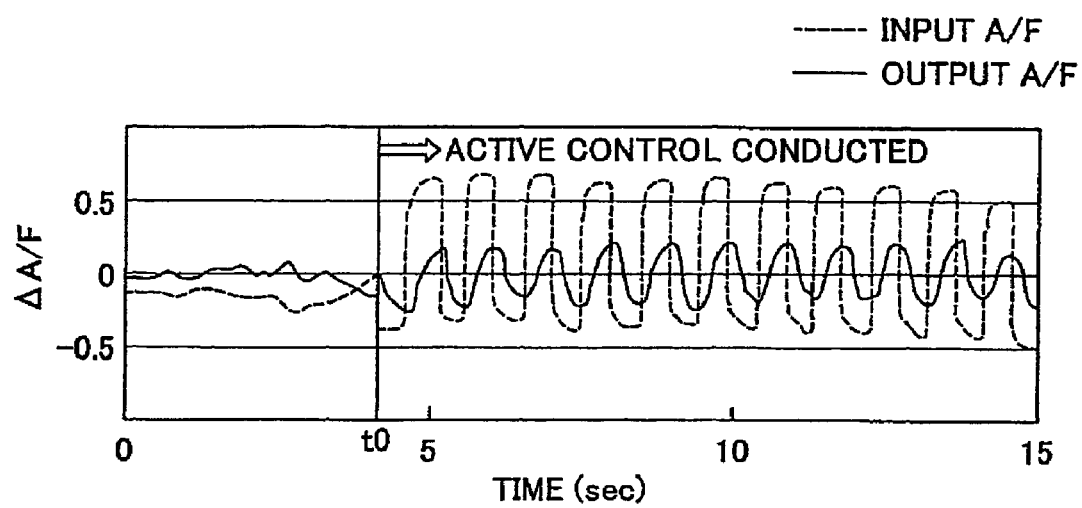
FIGS. 4A and 4B show results of a test showing changes in the time constant and the gain relative to changes in the input air-fuel ratio and the output air-fuel ratio of the pre-catalyst sensor in the case where the sensor is abnormal.
Figure 4B:
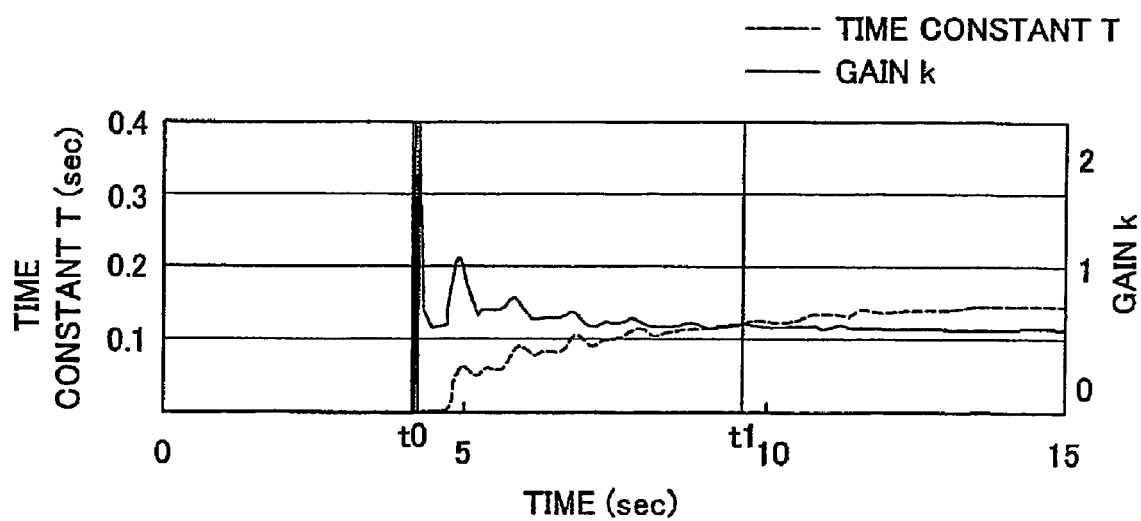

FIGS. 3A and 3B and FIGS. 4A and 4B show results of the recursive identification of the time constant T and the gain k by the recursive least square method in the case of a normal pre-catalyst sensor 17 and the case of an abnormal pre-catalyst sensor 17. Specifically, FIGS. 3A and 3B show results in the case of the normal pre-catalyst sensor 17, and FIGS. 4A and 4B show results in the case of the abnormal pre-catalyst sensor 17. FIGS. 3A and 4A each show oscillations of the input air-fuel ratio (a dashed line) and of the output air-fuel ratio (a solid line).

FIGS. 3B and 4B each show transitions of the time constant T (a dashed line) and of the gain k (a solid line) from the start of the active control. The time constant T and the gain k are updated at every sample time, and gradually converge to constant values. At a time point (determination timing) t1 at the elapse of a predetermined time (e.g., 5 seconds) that allows substantial convergence of the two values following the time of the start of the active control (the time of the start of the identification) t0, the time constant T and the gain k are acquired. The time constant T and the gain k thus acquired are compared with the abnormality criterion values Ts1, ks1, ks2, whereby the abnormality determination regarding the response rate and the output is carried out.

A sensor being substantially equal in the response rate to the normal pre-catalyst sensor 17 but being ½ as large in the output as the normal pre-catalyst sensor 17 was used as an abnormal pre-catalyst sensor 17 to perform the test. Results of the test were that the time constant T at the determination timing t1 was 0.18 in the case of the normal sensor, and was 0.17 in the case of the abnormality sensor, that is, the time constants T in the two cases were substantially the same. On the other hand, the gain k at the determination timing t1 was 1 in the case of the normal sensor, and was 0.5 in the case of the abnormal sensor. Thus, it was confirmed that substantially the same results as in the case of actual sensors would be obtained.

Incidentally, the actual engine is subject to various external disturbances, including load fluctuations or the like. If such disturbances are not appropriately taken into account, the identification accuracy and the robustness cannot be improved. Therefore, in the abnormality diagnosis in accordance with this embodiment, various corrections as described below are performed with respect to the input/output data.

Figure 5:
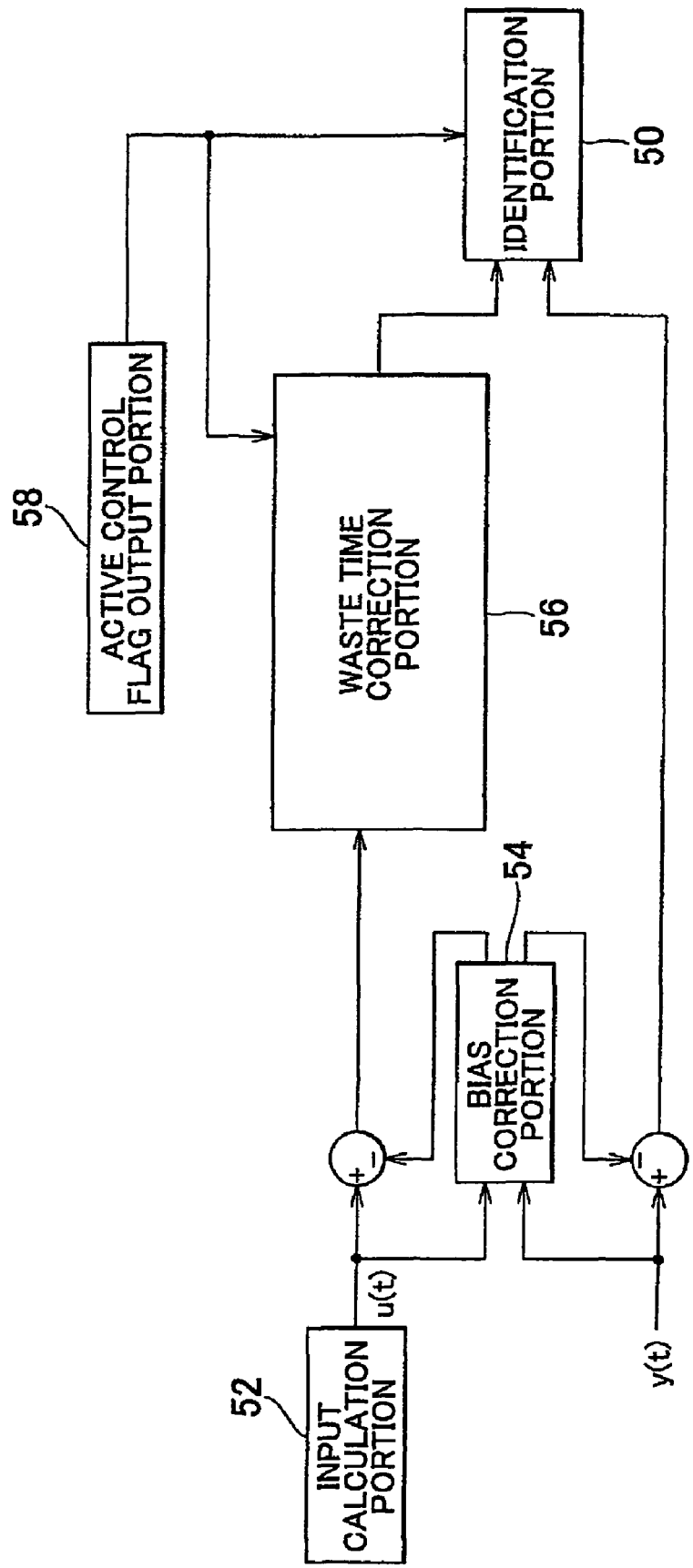
FIG. 5 is a block diagram of an entire system for identifying parameters which is constructed within an ECU 20.

FIG. 5 is a block diagram of an entire system for identifying model parameters. Such a system is constructed within the ECU 20. In order to perform the identification of the parameters T, k as described above in an identification portion (identification device) 50, there are provided an input calculation portion 52, a bias correction portion (bias correction device) 54, and a waste time correction portion (waste time correction device) 56. In addition, since the abnormality diagnosis is performed during the active control, an active control flag output portion 58 is provided.

The input calculation portion 52 calculates an input air-fuel ratio u(t). The input air-fuel ratio u(t), in the foregoing example, was a ratio Ga/Q between the fuel injection amount Q calculated on the basis of the duration of electrification of the injector 12, and the intake air amount Ga calculated on the basis of the air flow meter 5. However, in this example, the fuel injection amount Q calculated on the basis of the injector electrification duration is corrected on the basis of the amount of fuel deposit on the wall and the amount of evaporation of fuel, and the post-correction fuel injection amount Q' is used to calculate the input air-fuel ratio u(t). That is, u(t)=Ga/Q'. In consequence, the input air-fuel ratio u(t) is corrected on the basis of the wall deposit amount and the evaporation amount of fuel.

When fuel injected from an injector 12, most of the injected fuel is taken into the in-cylinder combustion chamber 3 while the rest of the injected fuel deposits on an internal wall surface of the intake port and does not enter the combustion chamber 3. Therefore, if the amount of fuel injected from the injectors 12 is written as fi and the fuel deposition rate for all the cylinders is written as R (<1), the portion of the injected fuel amount fi that deposits on the intake port wall surfaces is expressed as R·fi and the portion thereof that enters the combustion chambers 3 is expressed as (1−R)×fi.

The fuel deposited on the intake port wall surface of each cylinder partly evaporates and enters the combustion chamber 3 during the next intake stroke while the rest of it remains deposited. Therefore, if the amount of fuel deposited on the intake port wall surfaces is written as fw and the fuel residual rate for all the cylinders is written as P (<1), the portion of the wall surface-deposited fuel amount fw that remains deposited on the wall surfaces is expressed as P×fw and the portion thereof that enters the combustion chambers 3 is expressed as (1−P)×fw.

The period during which the strokes of the engine, that is, the intake stroke, the compression stroke, the expansion stroke and the exhaust stroke, are each completed once (i.e., one cycle=720° crank angle), is termed one cycle of the engine, and herein the present cycle is written as ks, and the next cycle is written as ks+1. Further, the amount of fuel that enters the in-cylinder combustion chambers 3 is written as fc. Then, the following relationships are satisfied.

$$fw(ks+1)=P \times fw(ks)+R \times fi(ks) \quad (21)$$

$$fc(ks)=(1-P) \times fw(ks)+(1-R) \times fi(ks) \quad (22)$$

The equation (21) means that the wall surface-deposited fuel amount fw(ks+1) of the next cycle is represented by the sum of the remaining portion P×fw(ks) of the wall surface-deposited fuel amount fw(ks) of the present cycle and the wall surface-deposited portion R×fi(ks) of the injected fuel amount fi(ks). Besides, the equation (22) means that the inflow fuel amount fc(ks) that flows into the combustion chambers 3 for the present cycle is represented by the sum of the evaporated portion (1−P)×fw(ks) of the wall surface-deposited fuel amount fw(ks) of the present cycle and the portion (1−R)×fi(ks) of the injected fuel amount fi(ks) that does not deposit on the wall surfaces but flows directly into the combustion chambers 3.

Thus, the inflow fuel amount fc is used as a value of the fuel injection amount Q' in the calculation of the input air-fuel ratio u(t). The inflow fuel amount fc is the amount obtained through a correction in which the fuel injection amount calculated on the basis of the electrification duration of the injectors 12 is corrected on the basis of the wall surface-deposited fuel amount and the evaporated fuel amount. Hence, by using a value of the inflow fuel amount fc in the calculation of the input air-fuel ratio u(t), the value of the input air-fuel ratio can be made to be a more accurate value that is closer to the actual value, and therefore it becomes possible to improve the accuracy of the parameter identification.

Since the higher the engine temperature and the intake air temperature, the vaporization of fuel is more accelerated, and therefore the fuel deposit amount becomes smaller and the fuel evaporation amount becomes greater. Therefore, it is preferable that the fuel residual rate P and the fuel deposition rate R be each a function of at least one of the engine temperature (or the water temperature) and the intake air temperature. The correction based on the wall surface-deposited fuel amount and the fuel evaporated amount as described above will be referred to as "fuel dynamics correction".

Figure 6:
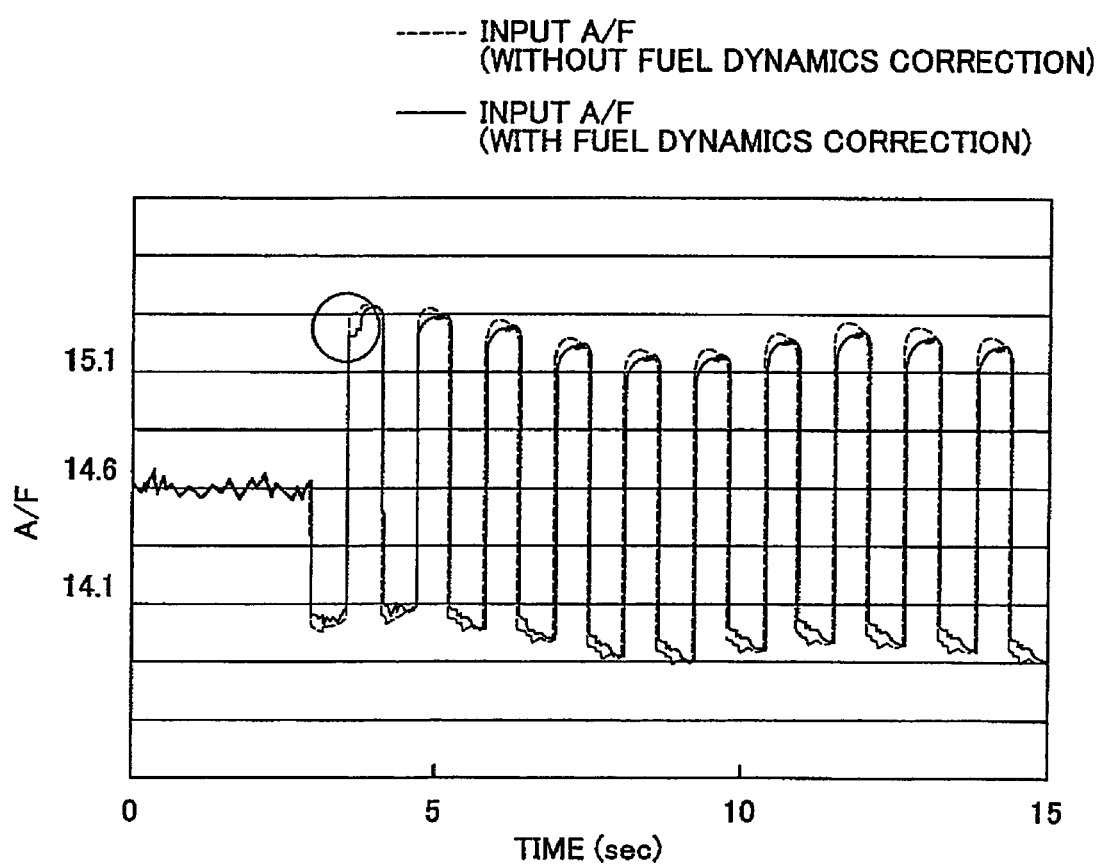
FIG. 6 shows results of a test in which input air-fuel ratios are compared between the case where a fuel dynamics correction is performed and the case where the fuel dynamics correction is not performed.

FIG. 6 shows results of a test that investigated the difference in the change of the input air-fuel ratio u(t) during the active control between the case where the fuel dynamics correction was not performed (a dashed line) and the case where the fuel dynamics correction was performed (a solid line). As shown in a circle in FIG. 6, there is a tendency of the waveform of the input air-fuel ratio u(t) being slightly lessened in sharpness or the like immediately after the inversion of the input air-fuel ratio u(t) in the case where the fuel dynamics correction was performed, as compared with the case where the fuel dynamics correction was not performed.

Next, the bias correction portion 54 will be described. In the bias correction portion 54, the input air-fuel ratio u(t) and the output air-fuel ratio y(t) are both subjected to such a shift correction as to remove the bias between the input air-fuel ratio u(t) and the output air-fuel ratio y(t).

Figure 7:
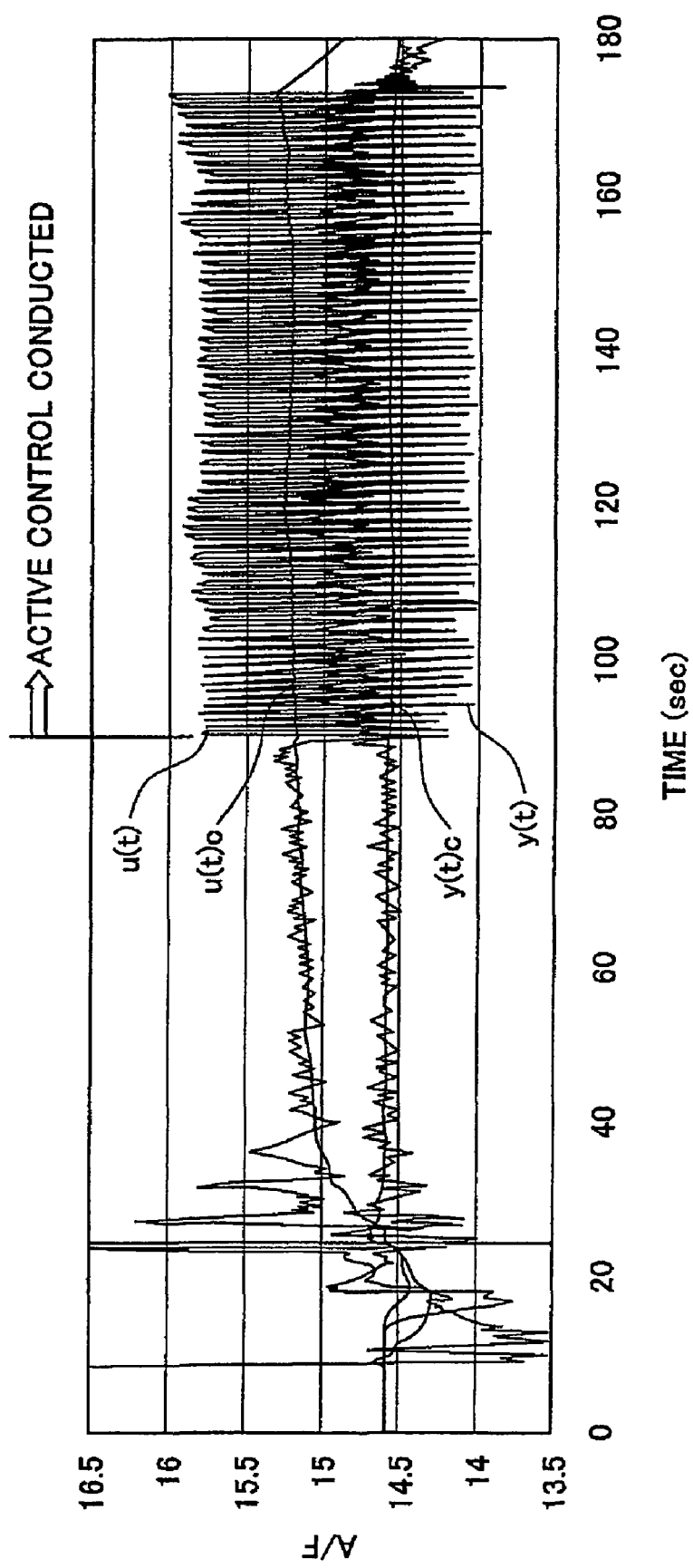
FIG. 7 shows results of a test showing states of changes in the input air-fuel ratio and the output air-fuel ratio of the pre-catalyst sensor prior to a bias correction.

The input air-fuel ratio u(t) and the output air-fuel ratio y(t) sometimes become biased (deviate) from each other, that is, one of the two ratios may become biased to the fuel lean side or the fuel rich side with respect to the other ratio, in association with a factor such as load fluctuation, learning deviation, sensor value deviation, etc. FIG. 7 shows test results showing the state of the bias. In FIG. 7, u(t)c and y(t)c show a value obtained by passing the input air-fuel ratio u(t) and the output air-fuel ratio y(t), respectively, through a low-pass filter, or show a moving average thereof. Since a control is performed so that the air-fuel ratio detected by the pre-catalyst sensor 17 becomes close to the stoichiometric air fuel ratio (A/F=14.6), the output air-fuel ratio y(t), which is a value detected by the pre-catalyst sensor 17, fluctuates about the stoichiometric air fuel ratio, and the value obtained by passing the output air-fuel ratio y(t) through a low-pass filter or the moving average y(t)c of the output air-fuel ratio y(t) is kept close to the stoichiometric air fuel ratio. On the other hand, the input air-fuel ratio u(t) is biased to the lean side in the example shown in the drawing for the foregoing reason.

Figure 8:
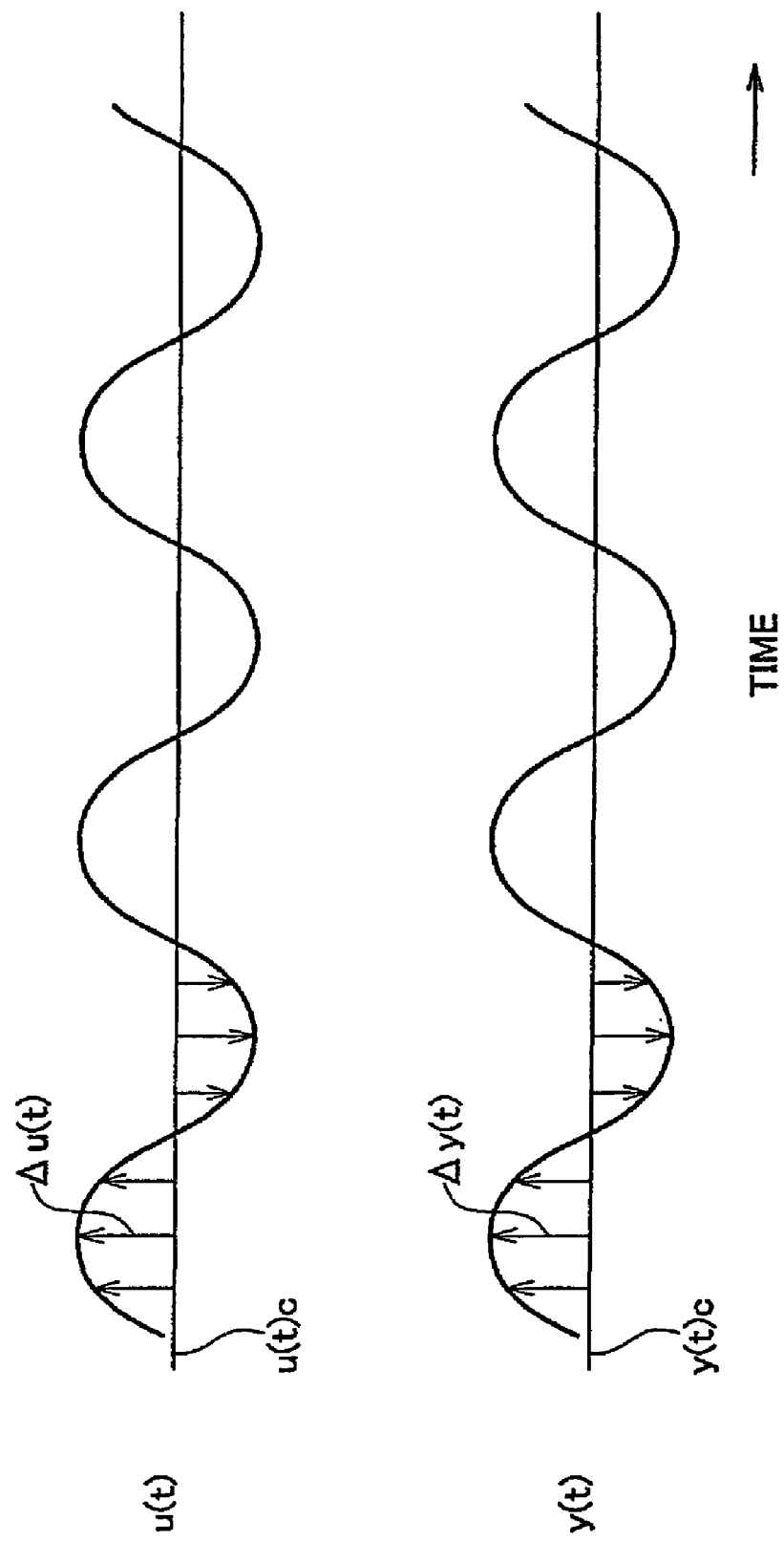
FIG. 8 is a schematic diagram for describing a method of the bias correction.

Since it is not preferable to perform the identification in such a biased state, a correction for removing the bias is performed. Concretely, as shown in FIG. 8, the data regarding the input air-fuel ratio u(t) and the output air-fuel ratio y(t) is passed through a low-pass filter, or moving averages thereof are calculated, and bias values u(t)c, y(t)c are serially calculated. Then, serially, a difference Δu(t) (=u(t)−u(t)c) between the input air-fuel ratio u(t) and its bias value u(t)c and a difference Δy(t) (=y(t)−y(t)c) between the output air-fuel ratio y(t) and its bias value y(t)c are calculated, and the differences Δu(t), Δy(t) are replaced with zero-reference values. Incidentally, the differences Δu(t), Δy(t) will be collectively indicated by ΔA/F (which also applies in FIGS. 3A and 4A).

Figure 9:
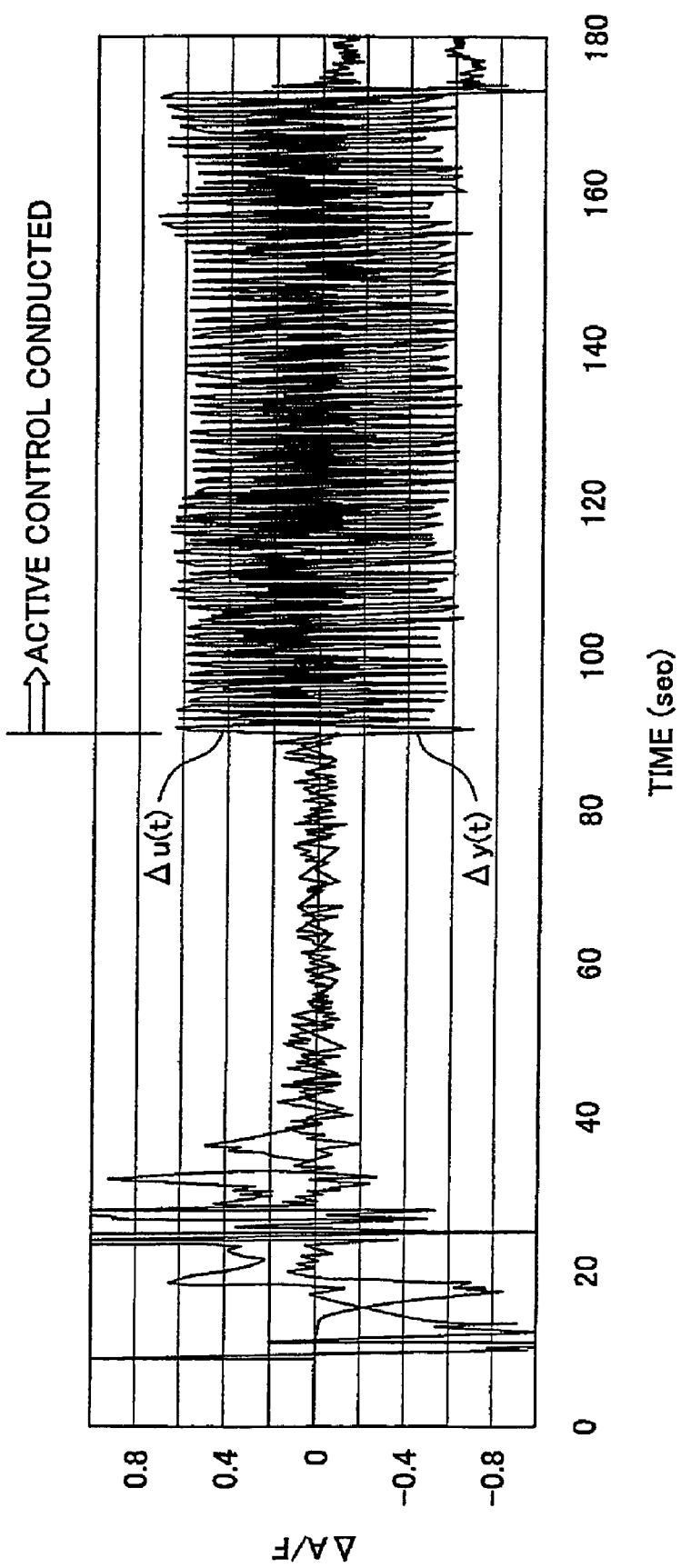
FIG. 9 shows results of a test showing states of changes in the input air-fuel ratio and the output air-fuel ratio of the pre-catalyst sensor after the bias correction.

The biases are thus removed, and the values Δu(t), Δy(t) of the post-bias-removal input and output air-fuel ratios are changed to the zero-reference values as shown in FIG. 9. That is, the centers of fluctuation of the two values are made to coincide with each other, so that the effects of load fluctuation, learning deviation, etc., can be eliminated. Therefore, the robustness against load fluctuation, learning deviation, etc., can be heightened.

This example employs a method in which the bias between the input and output air-fuel ratios is removed by correcting both the input and output air-fuel ratios so as to cause the centers of fluctuation of the input and output air-fuel ratios to coincide with zero. However, methods other than the foregoing method can also be employed. For example, it is permissible to correct only the input air-fuel ratio so as to cause the center of fluctuation of the input air-fuel ratio to coincide with the center of fluctuation of the output air-fuel ratio or perform a similar correction in the other way around. That is, the object of the correction may be at least one of the input and output air-fuel ratios.

Next, the waste time correction portion 56 will be described. As described above, the waste time L due to a transportation delay exists between the input air-fuel ratio u(t) and the output air-fuel ratio y(t). However, in order to perform accurate identification of the model parameters, it is preferable to perform such a correction as to remove the waste time L. This correction is performed by the waste time correction portion 56. Concretely, the waste time L is calculated by a method described below, and the input air-fuel ratio u(t) is delayed by the amount of the waste time L so as to approach the output air-fuel ratio y(t).

Figure 10:
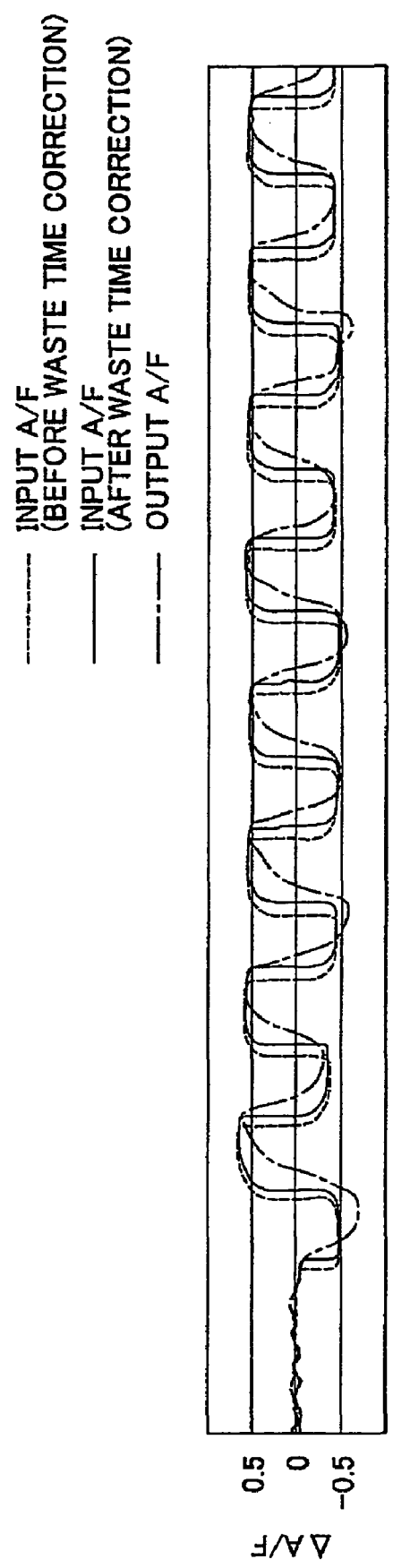
FIG. 10 shows results of a test showing the pre-waste-time-correction input air-fuel ratio.

FIG. 10 shows the pre-waste-time-correction input air-fuel ratio (a dashed line), the post-waste-time-correction input air-fuel ratio (a solid line) and the output air-fuel ratio (a one-dot chain line). Incidentally, post-bias-correction values are used as the input air-fuel ratio and the output air-fuel ratio. If the input air-fuel ratio is delayed by the amount of the waste time L, the oscillation of the input air-fuel ratio and the oscillation of the output air-fuel ratio become synchronous without a time difference therebetween, so that the parameter identification accuracy can be improved.

Figure 11:
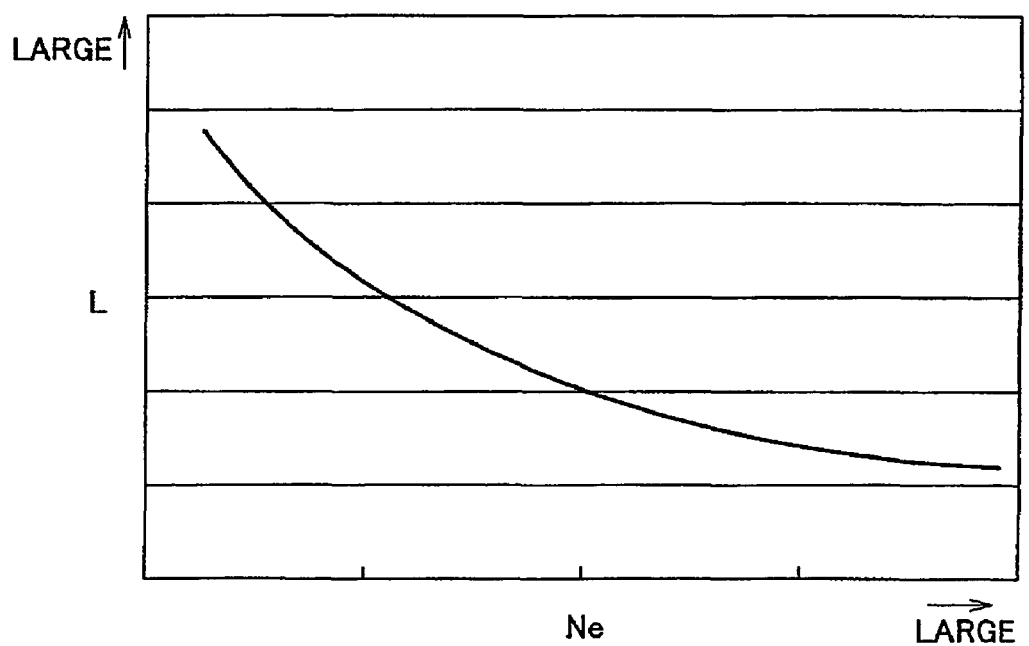
FIG. 11 shows a waste time calculation map.

A first mode (method) for the calculation of the waste time is a method in which a waste time is calculated on the basis of at least one parameter related to the engine operation state in accordance with a predetermined map or function. FIG. 11 shows an example of such a waste time calculation map. This map has been prepared beforehand so that the waste time L is calculated on the basis of a detected value of the engine rotation speed Ne.

A second mode (method) for the calculation of the waste time is as follows. Firstly, dispersion values of the input air-fuel ratio and of the output air-fuel ratio during the active control are serially found as in the following equation:

$$分散 = \frac{1}{M}\sum_{j=1}^{M}\{\eta(t-j) - \eta_{avg}(t)\}^2$$

In the equation, η is the value of the input air-fuel ratio or the output air-fuel ratio, and $\eta_{avg}$ is an m-time moving average, that is, an average of the values from the present time (t) up to the (M−1) number of times before the present, that is, the time (t−(M−1)). M is, for example, 5 or the like. The greater the change in the input air-fuel ratio or the output air-fuel ratio, the greater the dispersion value thereof.

Figure 12:
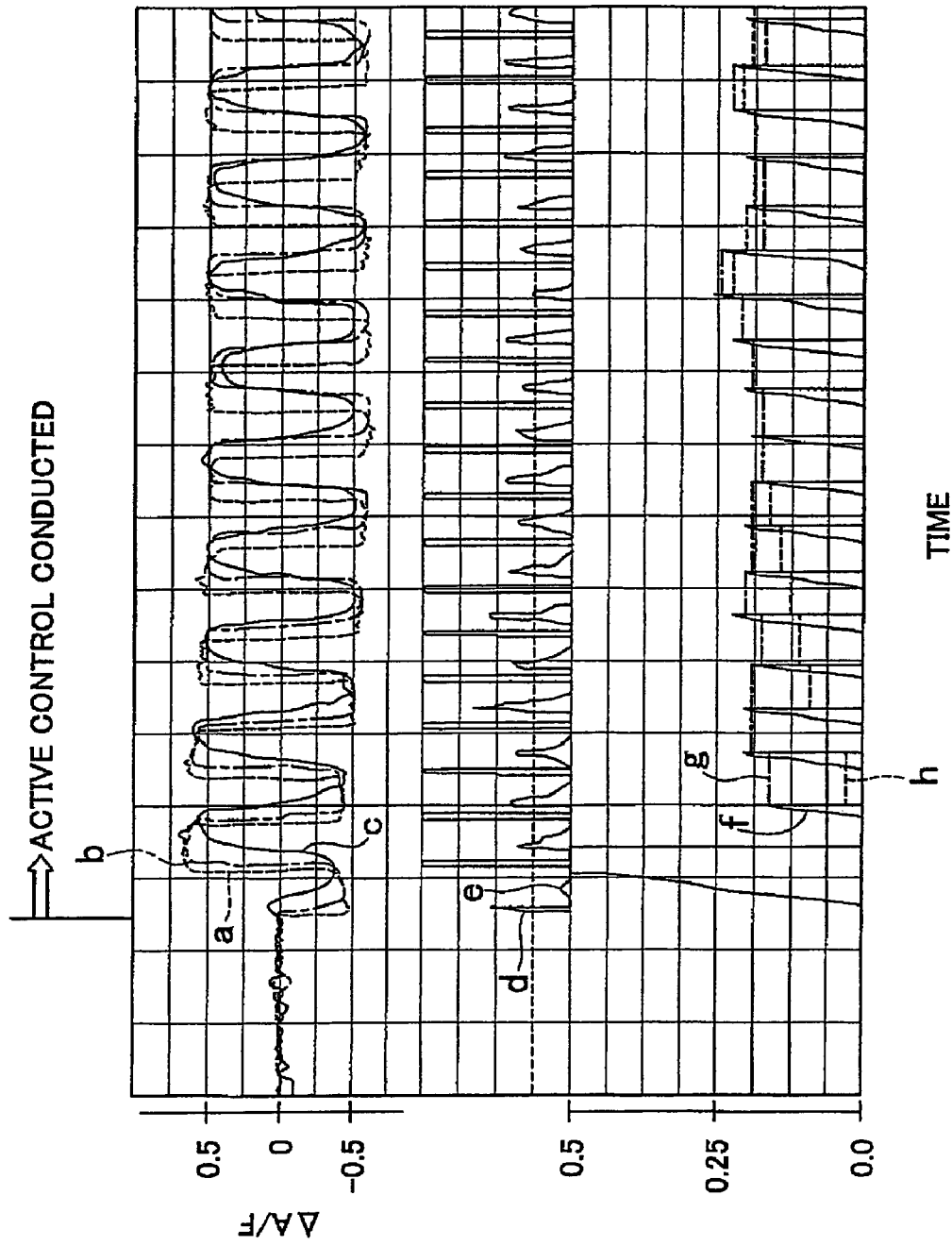
FIG. 12 shows results of a test for describing a second mode of the waste time calculation in the case of a normal sensor.

FIG. 12 shows results of a test regarding the waste time correction in the case where the sensor is normal. An upper graph shows (a) the pre-waste-time-correction input air-fuel ratio, (b) the post-waste-time-correction input air-fuel ratio, and (c) the output air-fuel ratio. Incidentally, the input air-fuel ratios shown by (a) and (b) are the values after the fuel dynamics correction and the bias correction are performed, and the output air-fuel ratio shown by (c) is the value after the bias correction is performed. An intermediate graph shows (d) the dispersion value of the pre-waste-time-correction input air-fuel ratio shown by (a), and (e) the dispersion value of the output air-fuel ratio shown by (c). In a lower graph, a saw-tooth waveform f shows the value of a waste time counter, and a horizontal line g provided at a high position shows a waste time calculated as described below, and a horizontal line h at a low position shows a value obtained by lessening the waste time g to ¼ thereof.

Figure 13:
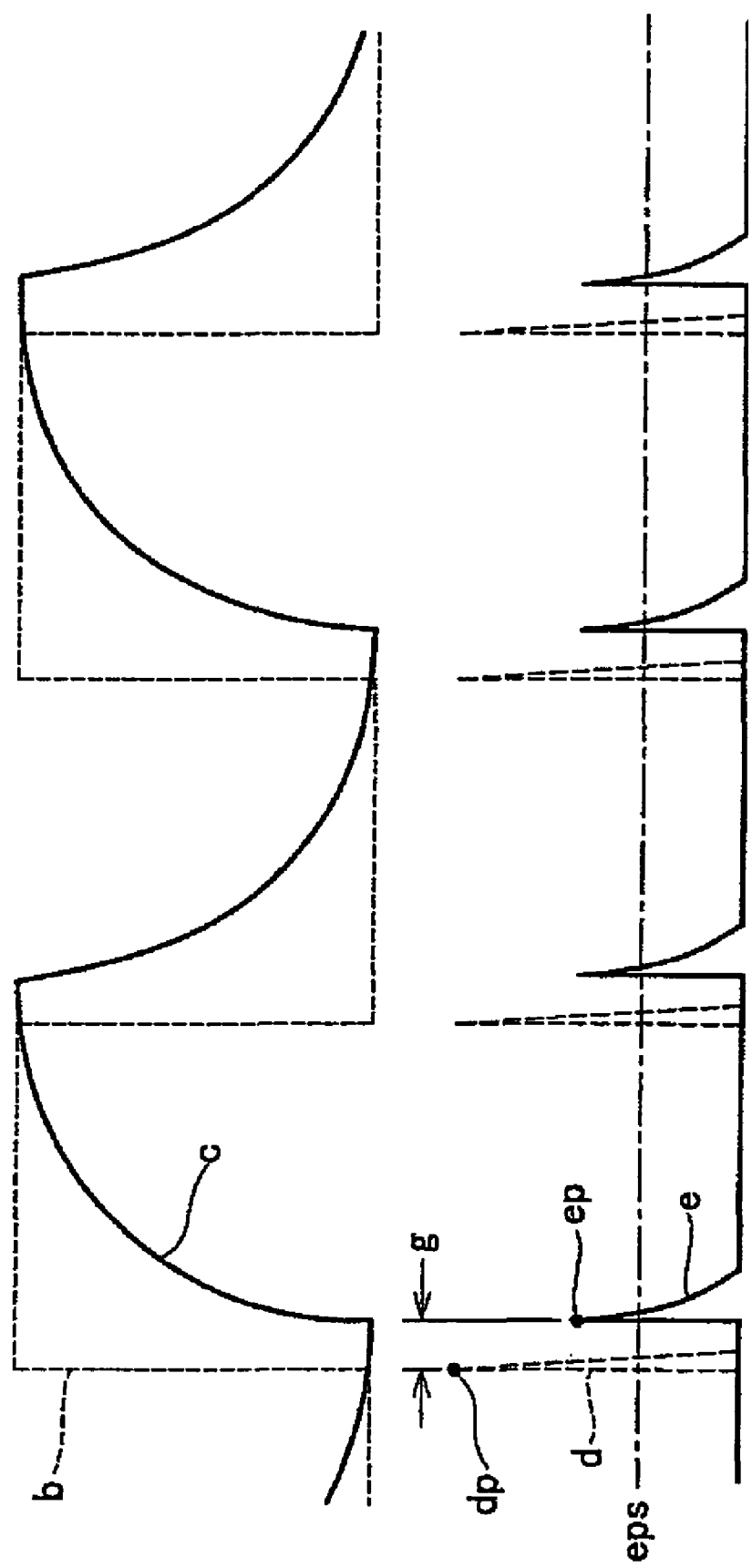
FIG. 13 is a schematic diagram for describing a waste time calculation method which corresponds to FIG. 12.

FIG. 13 shows only the lines b, c, d, e in FIG. 12 in a simplified illustration. As can be understood from FIG. 13, the dispersion value d of the input air-fuel ratio and the dispersion value e of the output air-fuel ratio exhibit peaks dp, ep thereof at a timing at which the input air-fuel ratio b and the output air-fuel ratio c, respectively, turn the other way around. Hence, the time difference (ep−dp) between the peaks is calculated as a waste time g. Referring back to FIG. 12, at the time when the dispersion value peak dp of the input air-fuel ratio occurs, a waste time counter f starts counting time. Then, at the time point when the dispersion value peak ep of the output air-fuel ratio occurs, the count value of the counter is held as a waste time g. This waste time g is updated every time the input air-fuel ratio turns the other way around. Furthermore, every time the input air-fuel ratio turns the other way around, the post-lessening waste time b is calculated. A reason for calculating the post-lessening waste time h is to remove the effect of noises. The value of the post-lessening waste time h converges to the vicinity of a constant value. At the time point of the elapse of a predetermined time when the post-lessening waste time h converges to a substantially constant value, the post-lessening waste time h is acquired, and then the acquired value is determined as a final waste time L.

Figure 14:
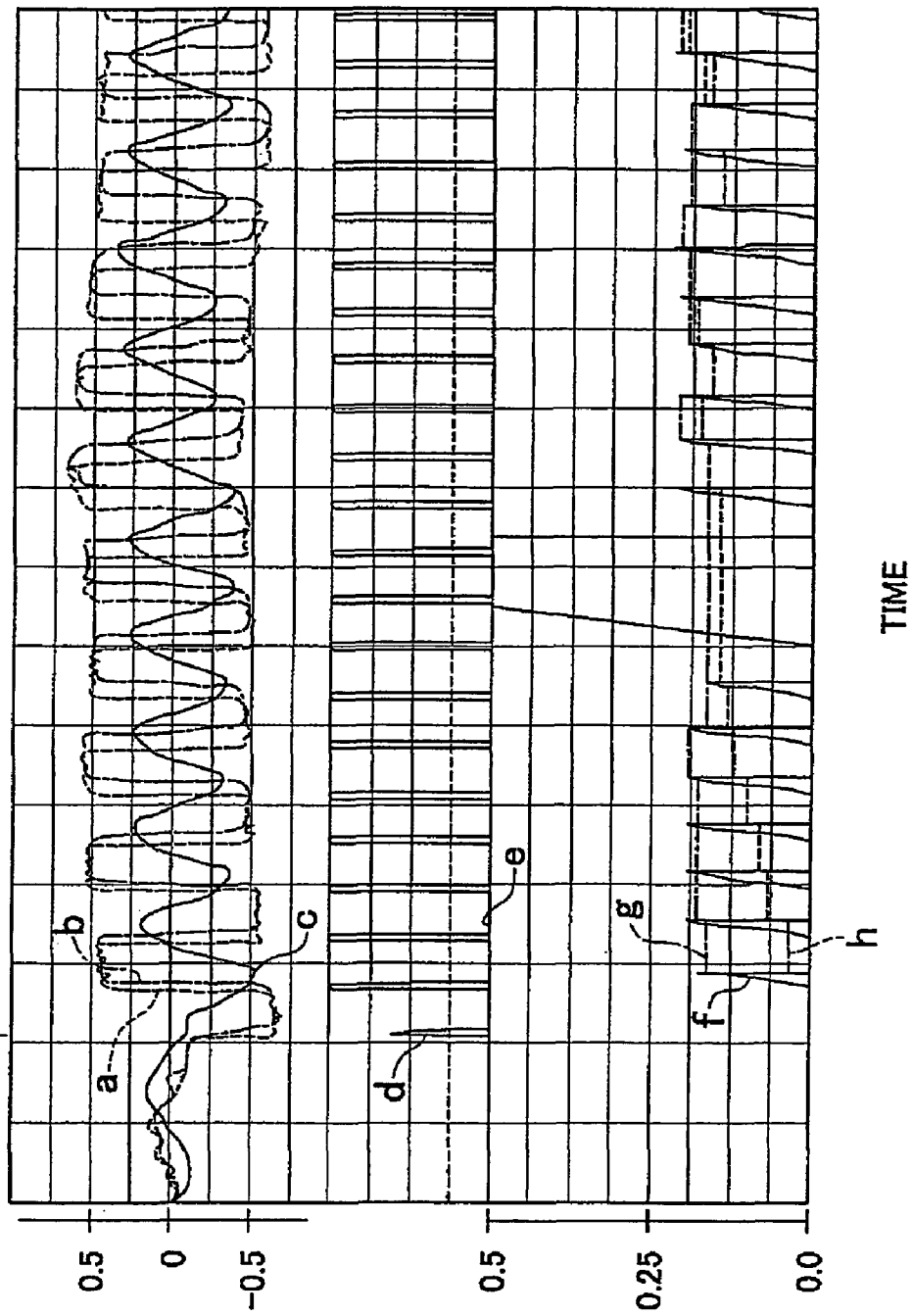
FIG. 14 shows results of a test for describing a second mode of the waste time calculation in the case of an abnormal sensor.
Figure 15:
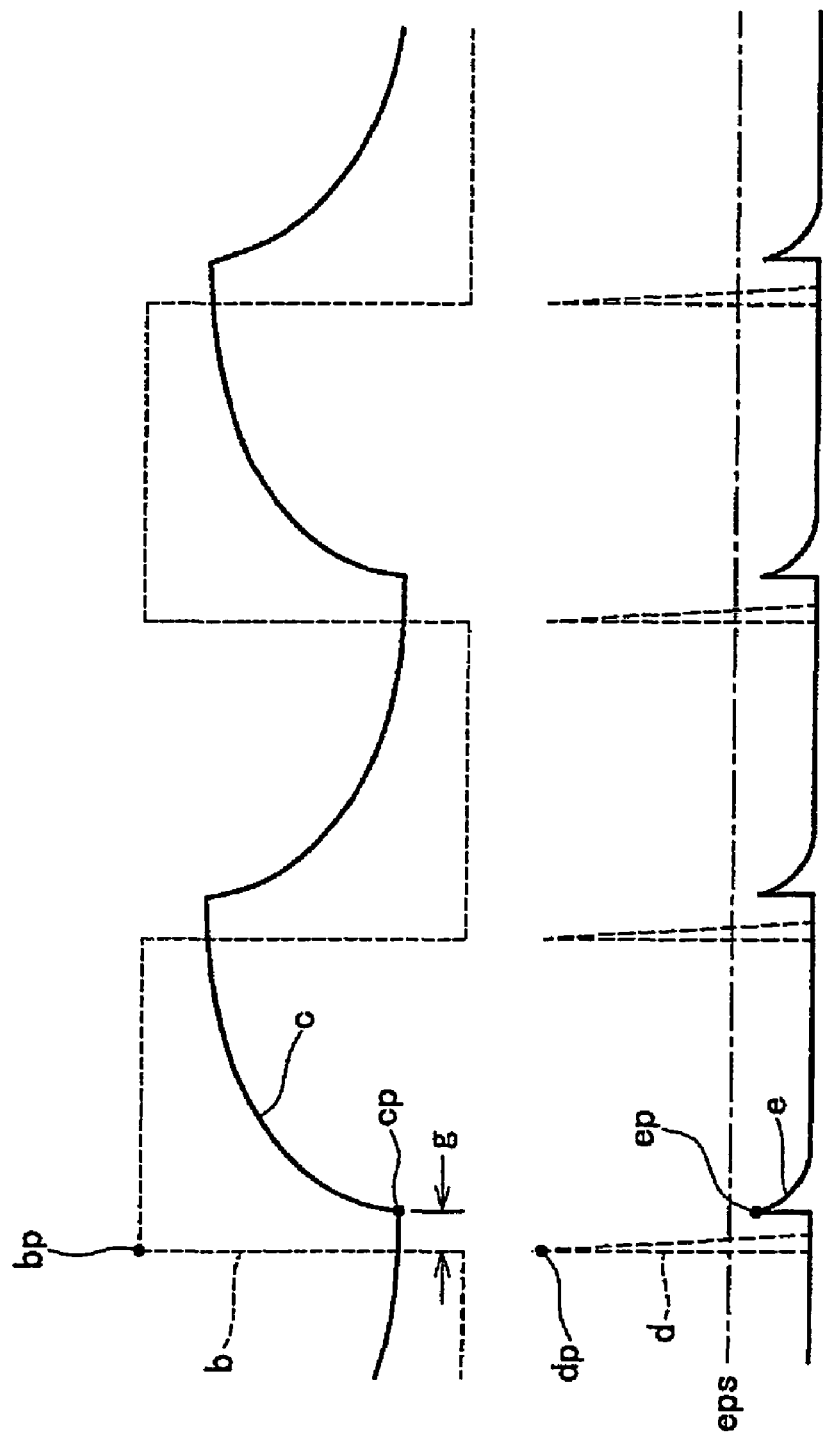
FIG. 15 is a schematic diagram for describing a waste time calculation method which corresponds to FIG. 14.

Incidentally, the calculation method described with reference to FIGS. 12 and 13 is for the case of a normal sensor. However, in the case of an abnormal sensor, employment of the same method is not necessarily appropriate. For example, in the case of an abnormal sensor with a response delay as shown in FIGS. 14 and 15, sufficiently large values as the dispersion value e of the output air-fuel ratio b cannot be obtained, and the error regarding the timing at which the peak ep of the dispersion value e appears becomes large.

Therefore, the dispersion value peak ep of the output air-fuel ratio is compared with a predetermined threshold value eps. If the dispersion value peak ep is larger than the threshold value eps as shown in FIGS. 12 and 13, the time difference (ep–dp) between the dispersion value peaks dp, ep of the input air-fuel ratio is adopted as the waste time g. On the other hand, if the dispersion value peak ep of the output air-fuel ratio is less than or equal to the threshold value eps as shown in FIGS. 14 and 15, the time difference (cp–bp) between the pole values bp, cp of the input and output air-fuel ratios b, c is adopted as the waste time g. Thus, the waste time can be accurately calculated even in the case of an abnormal sensor.

In the foregoing description, through the use of only one of the first mode and the second mode, the waste time can be calculated, and the waste time correction of the input air-fuel ratio can be performed. In a third mode, however, the waste time is calculated through the use of both the first mode and the second mode. In the third mode, the first waste time calculated from the map in accordance with the first mode and the second waste time calculated from the dispersion value or the pole value in accordance with the second mode are compared. If the first and second waste times are close to each other, the first waste time calculated from the map is used. On the other hand, if the two waste times are apart from each other, the second waste time calculated from the dispersion value or the pole value is used, and the map data is updated through the use of the second waste time. Basically, the value of the optimal waste time does not greatly deviate from the map value. However, there is a possibility of the value of the optimal waste time greatly deviating from the map value for some reason. The second waste time calculated from the dispersion value or the pole value can be said to be an actual value that reflects the present situations. Hence, by updating the map in this manner, it becomes possible to cope with an accidental situation, and also it becomes possible to constantly keep the map data at optimal values that suit the present situations.

Figure 16:
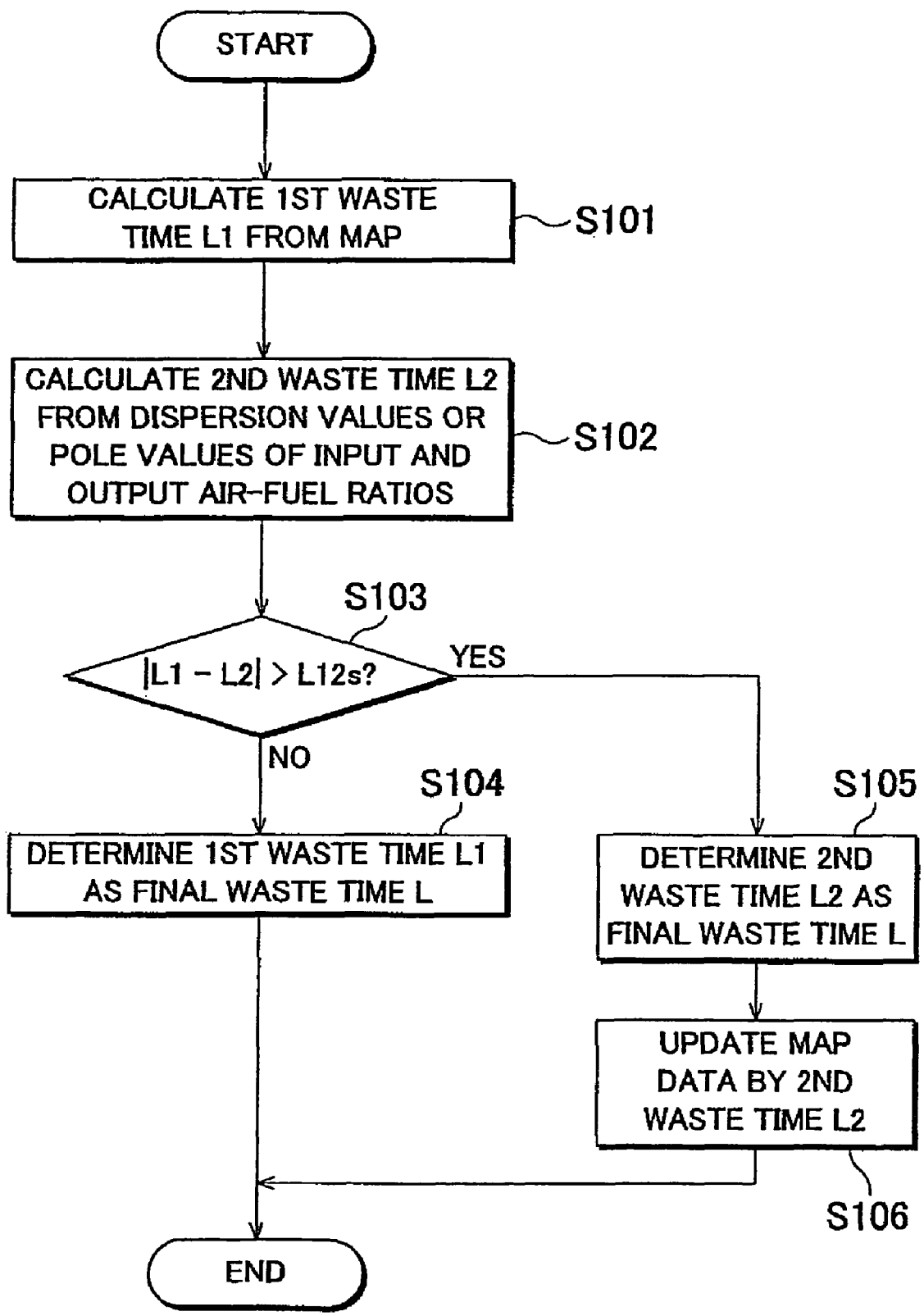
FIG. 16 is a flowchart of a third mode of the waste time calculation.

FIG. 16 schematically shows a procedure of the third mode. Firstly in step S101, the first waste time L1 is calculated from a map as shown in FIG. 11 in accordance with the first mode. Then in step S102, the second waste time L2 is calculated from the dispersion values or the pole values of the input and output air-fuel ratios in accordance with the second mode. After that, in step S103, a waste time deviation amount L12 that is the absolute value of a difference between the first and second waste times L1, L2 is calculated. The waste time deviation amount L12 is compared with a predetermined value L12s. If the waste time deviation amount L12 is less than or equal to the predetermined value L12s, the deviation between the two waste times is considered to be small, and then in step S104, the first waste time L1 calculated from the map is determined as a final waste time L.

On the other hand, if the waste time deviation amount L12 is greater than the predetermined value L12s, the deviation between the two waste times is considered to be great, and in step S105, the second waste time L2 calculated from the dispersion values or the pole values of the input and output air-fuel ratios is determined as a final waste time L. Then, in step S106, the first waste time L1 in the map that corresponds to the second waste time L2 is replaced with the second waste time L2 to update the map data.

Although in the foregoing waste time correction, the input air-fuel ratio is delayed by the amount of the waste time so as to coincide in timing with the output air-fuel ratio, other correction methods may also be employed. For example, it is possible to employ a method in which recursive identification is not performed, for example, a method in which many pieces of sample data are acquired and temporarily stored, and then the identification is performed. In such a method, the output air-fuel ratio can be advanced by the amount of the waste time so as to coincide in timing with the input air-fuel ratio, or the input air-fuel ratio can be delayed and the output air-fuel ratio can be advanced so that the input and output air-fuel ratios coincide in timing with each other. It suffices that the object of the correction is at least one of the input and output air-fuel ratios.

Figure 17:
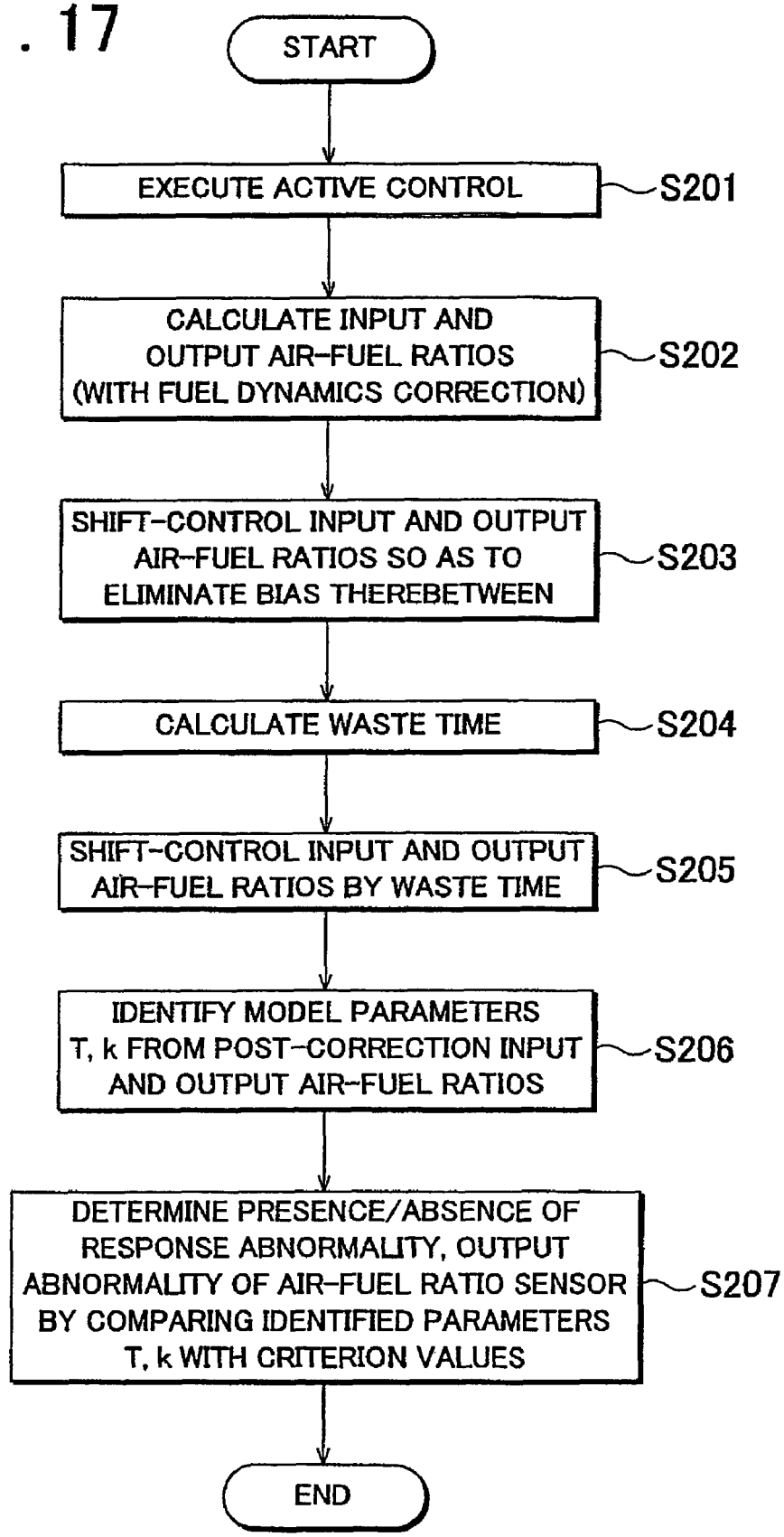
FIG. 17 is a flowchart schematically showing a procedure of abnormality diagnosis of the air-fuel ratio sensor in the embodiment.

Next, a procedure of an air-fuel ratio sensor abnormality diagnosis that includes all the foregoing corrections will be described with reference to FIG. 17. Firstly, in step S201, the active control of compulsorily oscillating the air-fuel ratio is executed. In step S202, a post-fuel-dynamics-correction value of the input air-fuel ratio u(t) is calculated. In step S203, the values of the input air-fuel ratio u(t) and the output air-fuel ratio y(t) are subjected to the shift correction so that the bias between the input and output air-fuel ratios disappears as shown in FIGS. 7 to 9.

Subsequently in step S204, the waste time L is calculated. In step S205, the post-bias-correction value of the input air-fuel ratio u(t) is subjected to the shift correction with the amount of the waste time L. Subsequently in step S206, the time constant T and the gain k, which are model parameters, are identified from the relationship between the post-waste-time-correction input air-fuel ratio u(t) obtained in step S205 and the post-bias-correction output air-fuel ratio y(t) obtained in step S203. Then, in step S207, the identified parameters T, k are compared with various abnormality criterion values (the time constant abnormality criterion value Ts, the gain increase abnormality criterion value ks1, and the gain reduction abnormality criterion value ks2), and thus the normality/abnormality of the response rate and the output of the air-fuel ratio sensor (the pre-catalyst sensor 17) is determined.

While a preferred embodiment of the invention has been described above, various other embodiments of the invention are also conceivable. For example, although the foregoing internal combustion engine is of an intake port (intake passageway) injection type, the invention is also applicable to a direct injection type engine. In this case, however, the deposition of fuel on the intake passageway wall surface does not need to be considered, and therefore the fuel dynamics correction is omitted. Although in the foregoing embodiment, the invention is applied to a so-called wide-range air-fuel ratio sensor, the invention is also applicable to a so-called $O_2$ sensor such as the post-catalyst sensor 18. Sensors in a broad meaning for detecting the air-fuel ratio of exhaust gas, including $O_2$ sensors, are termed air-fuel ratio sensors in the invention. Although in the embodiment, abnormality is diagnosed regarding the two of the characteristics of the air-fuel ratio sensor, that is, the response rate and the output, this is not restrictive. For example, abnormality may also be diagnosed regarding one of or three or more of the characteristics. Besides, the parameter in the first order response delay may also be only one of the time constant T and the gain k, or may also include a different parameter in addition to the time constant T and the gain k. Although in the embodiment the two parameters T, K in the first order response delay are simultaneously identified and the presence/absence of an abnormality is determined regarding the two characteristics of the air-fuel ratio sensor, this is not restrictive. For example, at least two parameters may be identified with a time difference therebetween, or the presence/absence of an abnormality may be determined regarding at least two characteristics with a time difference therebetween.

Incidentally, in the foregoing embodiment, the ECU 20 constitutes an identification device, an abnormality determination device, a waste time correction device, a bias correction device, and a fuel correction device.

The embodiments of the invention are not limited to the foregoing embodiment. On the contrary, the invention includes all the modifications, applications, equivalents, etc., encompassed in the idea of the invention defined by the appended claims. Therefore, the invention should not be limitatively interpreted, but is applicable to any technology that belongs to the scope of the idea of the invention.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An abnormality diagnostic device for an air-fuel ratio sensor that detects air-fuel ratio of exhaust gas of an internal combustion engine, comprising:
    an ECU including an identification portion that causes the ECU to model a system extending from a fuel injection valve to the air-fuel ratio sensor by a first order response delay, and that identifies a parameter in the first order response delay based on an input air-fuel ratio that is given to the air-fuel ratio sensor and an output air-fuel ratio that is output from the air-fuel ratio sensor;
    a waste time correction portion that causes the ECU to calculate a waste time that elapses between the input air-fuel ratio and the output air-fuel ratio, and performs a shift correction of at least one of the input air-fuel ratio and the output air-fuel ratio by an amount of the waste time; and
    an abnormality determination portion that causes the ECU to determine presence/absence of abnormality regarding a predetermined characteristic of the air-fuel ratio sensor based on the parameter identified by the identification portion,
    wherein the waste time correction portion calculates a dispersion value of the input air-fuel ratio and a dispersion value of the output air-fuel ratio, and if a peak of the dispersion value of the output air-fuel ratio is greater than a predetermined value, the waste time correction portion calculates the waste time based on a time difference between a peak of the dispersion value of the input air-fuel ratio and the peak of the dispersion value of the output air-fuel ratio.

2. The abnormality diagnostic device according to claim 1, wherein the abnormality determination portion determines the presence/absence of abnormality regarding at least two of the characteristics of the air-fuel ratio sensor based on at least two parameters identified by the identification device.

3. The abnormality diagnostic device according to claim 2, wherein the at least two parameters are at least a time constant and a gain, and the at least two of the characteristics of the air-fuel ratio sensor are at least response rate and output.

4. The abnormality diagnostic device according to claim 1, wherein the waste time correction portion calculates the waste time in accordance with a predetermined map or a predetermined function based on at least one parameter regarding an operation state of the internal combustion engine.

5. The abnormality diagnostic device according to claim 1, wherein if the peak of the dispersion value of the output air-fuel ratio is less than or equal to the predetermined value, the waste time correction portion calculates the waste time based on a time difference between a pole value of the input air-fuel ratio and a pole value of the output air-fuel ratio.

6. The abnormality diagnostic device according to claim 1, wherein the waste time correction portion calculates a first waste time in accordance with a predetermined map, based on at least one parameter regarding an operation state of the internal combustion engine, and calculates a second waste time based on a time difference between a peak of a dispersion value of the input air-fuel ratio and a peak of a dispersion value of the output air-fuel ratio or a time difference between a pole value of the input air-fuel ratio and a pole value of the output air-fuel ratio, and wherein if a deviation amount of the second waste time from the first waste time is greater than a predetermined value, the waste time correction portion determines the second waste time as a final waste time, and updates data of the map using the second waste time.

7. The abnormality diagnostic device according to claim 1, further comprising a bias correction portion that causes the ECU to perform a shift correction of at least one of the input air-fuel ratio and the output air-fuel ratio so as to remove a bias between the input air-fuel ratio and the output air-fuel ratio.

8. The abnormality diagnostic device according to claim 1, further comprising a fuel correction portion that causes the ECU to perform the input air-fuel ratio based on a wall surface deposit amount of fuel and an evaporation amount of fuel.

9. The abnormality diagnostic device according to claim 1, wherein the identification portion serially identifies the parameter by a recursive least square method.

10. An abnormality diagnostic method for an air-fuel ratio sensor that detects air-fuel ratio of exhaust gas of an internal combustion engine, comprising:
    modeling a system extending from a fuel injection valve to the air-fuel ratio sensor by a first order response delay, and identifying a parameter in the first order response delay based on an input air-fuel ratio that is given to the air-fuel ratio sensor and an output air-fuel ratio that is output from the air-fuel ratio sensor;
    calculating a waste time that elapses between the input air-fuel ratio and the output air-fuel ratio, and performing a shift correction of at least one of the input air-fuel ratio and the output air-fuel ratio by an amount of the waste time; and
    determining presence/absence of abnormality regarding the air-fuel ratio sensor based on the parameter identified,
    wherein a dispersion value of the input air-fuel ratio and a dispersion value of the output air-fuel ratio are calculated, and wherein if a peak of the dispersion value of the output air-fuel ratio is greater than a predetermined value, the waste time is calculated based on a time difference between a peak of the dispersion value of the input air-fuel ratio and the peak of the dispersion value of the output air-fuel ratio.

11. The abnormality diagnostic method according to claim 10, wherein the presence/absence of abnormality is determined regarding at least two of characteristics of the air-fuel ratio sensor based on at least two parameters identified.

12. The abnormality diagnostic method according to claim 11, wherein the at least two parameters are at least a time constant and a gain, and the at least two of the characteristics of the air-fuel ratio sensor are at least response rate and output.

13. The abnormality diagnostic method according to claim 10, wherein the waste time is calculated in accordance with a predetermined map or a predetermined function based on at least one parameter regarding an operation state of the internal combustion engine.

14. The abnormality diagnostic method according to claim 10, wherein if the peak of the dispersion value of the output air-fuel ratio is less than or equal to the predetermined value, the waste time is calculated based on a time difference between a pole value of the input air-fuel ratio and a pole value of the output air-fuel ratio.

15. The abnormality diagnostic method according to claim 10, further comprising performing a shift correction of at least one of the input air-fuel ratio and the output air-fuel ratio so as to remove a bias between the input air-fuel ratio and the output air-fuel ratio.

16. The abnormality diagnostic method according to claim 10, further comprising correcting the input air-fuel ratio based on a wall surface deposit amount of fuel and an evaporation amount of fuel.

17. The abnormality diagnostic method according to claim 10, wherein the parameter is serially identified by a recursive least square method.

18. An abnormality diagnostic method for an air-fuel ratio sensor that detects air-fuel ratio of exhaust gas of an internal combustion engine, comprising:

modeling a system extending from a fuel injection valve to the air-fuel ratio sensor by a first order response delay, and identifying a parameter in the first order response delay based on an input air-fuel ratio that is given to the air-fuel ratio sensor and an output air-fuel ratio that is output from the air-fuel ratio sensor;

calculating a waste time that elapses between the input air-fuel ratio and the output air-fuel ratio, and performing a shift correction of at least one of the input air-fuel ratio and the output air-fuel ratio by an amount of the waste time; and determining presence/absence of abnormality regarding the air-fuel ratio sensor based on the parameter identified, wherein a first waste time is calculated in accordance with a predetermined map, based on at least one parameter regarding an operation state of the internal combustion engine, and a second waste time is calculated based on a time difference between a peak of a dispersion value of the input air-fuel ratio and a peak of a dispersion value of the output air-fuel ratio or a time difference between a pole value of the input air-fuel ratio and a pole value of the output air-fuel ratio, and wherein if a deviation amount of the second waste time from the first waste time is greater than a predetermined value, the second waste time is determined as a final waste time, and data of the map is updated using the second waste time.

\* \* \* \* \*